United States Patent
Wilson et al.

(10) Patent No.: US 12,363,253 B2
(45) Date of Patent: Jul. 15, 2025

(54) REALISTIC PERSONALIZED STYLE TRANSFER IN IMAGE PROCESSING

(71) Applicant: MICROSOFT TECHNOLOGY LICENSING, LLC, Redmond, WA (US)

(72) Inventors: Alexander J. Wilson, Seattle, WA (US); Tom Neckermann, Seattle, WA (US); Romain Gabriel Paul Rey, Vancouver (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 918 days.

(21) Appl. No.: 17/323,895

(22) Filed: May 18, 2021

(65) Prior Publication Data

US 2022/0377257 A1 Nov. 24, 2022

(51) Int. Cl.
| | |
|---|---|
| *H04N 5/272* | (2006.01) |
| *G06F 18/211* | (2023.01) |
| *G06N 3/08* | (2023.01) |
| *G06N 20/00* | (2019.01) |
| *G06T 7/73* | (2017.01) |

(52) U.S. Cl.
CPC ........... *H04N 5/272* (2013.01); *G06F 18/211* (2023.01); *G06N 3/08* (2013.01); *G06N 20/00* (2019.01); *G06T 7/73* (2017.01); *G06T 2207/20084* (2013.01); *H04N 2005/2726* (2013.01)

(58) Field of Classification Search
CPC .. H04N 2005/2726; H04N 7/157; H04N 7/15; G06T 2219/2024; G06T 2207/20221; G06V 40/168–171; G06N 3/0475; G06N 3/094

See application file for complete search history.

(56) References Cited

U.S. PATENT DOCUMENTS

| | | | |
|---|---|---|---|
| 10,628,931 B1 | 4/2020 | Ramos et al. | |
| 10,642,893 B2 | 5/2020 | Novikoff et al. | |
| 2020/0117348 A1 | 4/2020 | Jang et al. | |
| 2020/0358983 A1* | 11/2020 | Astarabadi | H04N 7/157 |

(Continued)

OTHER PUBLICATIONS

Liu, Luoqi, et al. "Wow! you are so beautiful today !. " ACM Transactions on Multimedia Computing, Communications, and Applications (TOMM) 11.1s (2014): 1-22. (Year: 2014).*

Chang, et al., "PairedCycleGAN: Asymmetric Style Transfer for Applying and Removing Makeup", In Proceedings of IEEE/CVF Conference on Computer Vision and Pattern Recognition, Jun. 18, 2018, pp. 40-48.

(Continued)

*Primary Examiner* — Raphael Schwartz
(74) *Attorney, Agent, or Firm* — Ray Quinney & Nebeker; James Bullough

(57) ABSTRACT

Computerized systems are provided for applying data indicative of a personal style to a feature of a user represented in one or more images based on determining or estimating the personal style. In operation, embodiments can receive a first image of a first user that indicates the personal style of the first user. The first image can then be fed to one or more machine learning models in order to learn and capture the personal style of the first user. Subsequently, some embodiments capture the first user in another image or set of images. Some embodiments can then detect one or more features of the first user in these other images and based on the determining of the user's personal style in the first image, can apply data indicative of the personal style of the first user to the one or more features of the user in these other images.

20 Claims, 14 Drawing Sheets

(56) References Cited

U.S. PATENT DOCUMENTS

| | | |
|---|---|---|
| 2021/0019541 A1 | 1/2021 | Wang et al. |
| 2021/0049468 A1 | 2/2021 | Karras et al. |
| 2021/0209464 A1* | 7/2021 | Bala ........................ G06N 20/00 |
| 2021/0295045 A1* | 9/2021 | Li ........................... G06N 3/045 |
| 2023/0102479 A1* | 3/2023 | Joecker .................. G06V 20/52 |
| | | 382/100 |

OTHER PUBLICATIONS

Chugh, Anupam, "Train and Run a Create ML Style Transfer Model in an iOS Camera Application", Retrieved from: https://heartbeat.fritz.ai/train-and-run-a-create-ml-style-transfer-model-in-an-ios-camera-application-84aab3b85458, Sep. 2, 2020, 24 Pages.

Horita, et al., "SLGAN: Style- and Latent-guided Generative Adversarial Network for Desirable Makeup Transfer and Removal", In Repository of arXiv:2009.07557v3, Sep. 24, 2020, 9 Pages.

Huang, et al., "Real-Time Neural Style Transfer for Videos", In Proceedings of IEEE Conference on Computer Vision and Pattern Recognition, Nov. 9, 2017, pp. 7044-7052.

Liu, et al., "Real-time Arbitrary Video Style Transfer", Retrieved from: https://magus.ink/homepage_static/paper/mmasia20-liuxy.pdf, Mar. 7, 2021, 7 Pages.

"International Search Report and Written Opinion Issued in PCT Application No. PCT/US22/026244", Mailed Date: Aug. 23, 2022, 15 Pages.

Jiang, et al., "PSGAN: Pose and Expression Robust Spatial-Aware GAN for Customizable Makeup Transfer", In Proceedings of IEEE/CVF Conference on Computer Vision and Pattern Recognition, Jun. 13, 2020, pp. 5194-5202.

\* cited by examiner

REALISTIC PERSONALIZED STYLE TRANSFER IN IMAGE PROCESSING

BACKGROUND

Computer-implemented technologies can assist users in communicating with other users over communication networks, and in particular, allow audio-visual exchange between each user. For example, meeting software applications can include audio-visual exchange functionality (e.g., via webcams and microphones) so that users can see each other during a meeting. Other technologies, such as filtering applications, can apply predetermined and standardized filters over images of users' faces, such as applying a set of pixels representing glasses or a hat over an image of the user. However, all of these existing technologies and others do not provide adequate functionality for intelligently capturing a user's personal style (e.g., hair style, makeup style, and the like) in an image and providing realistic style transfer of the user's personal style to other images of the user, among other things. Moreover, existing machine learning models are not only inaccurate, but they are destructive in nature because users typically have no control over different layers of style transfer functionality.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of this disclosure relate to applying data indicative of a personal style to a feature of a user represented in one or more images based on determining or estimating (e.g., via a machine learning model) the personal style. In particular, embodiments can receive a first image (e.g., a screenshot) of a first user that indicates the personal style of the first user, such as a hair style, makeup style, or clothing style of the first user. The first image can then be fed to one or more machine learning models in order to learn and capture the personal style of the first user. For example, a modified Generative Adversarial Network (GAN) can perform several training epochs to learn an optimal loss between multiple discriminators and a generator to apply the user's personal style of blue eyeshadow with blue lipstick at a particular realistic optimal pixel value intensity pattern. Subsequently, some embodiments capture the first user in another image or set of images. For example, using meeting application software, embodiments can capture the first user in a video feed, where the first user is not currently expressing their personal style (e.g., their hair is not styled). Some embodiments can then detect one or more features (e.g., eyes, lips, and the like) of the first user in these other images and based on the determining of the user's personal style in the first image, can apply (e.g., via the modified GAN model) data indicative of the personal style of the first user to the one or more features of the user in these other images.

This and other related functionality described herein improves existing facial filtering technologies, teleconferencing technologies, video sharing technologies, audio stream technologies, meeting recording technologies and/or machine learning models because particular embodiments can intelligently capture a user's personal style and subsequently perform realistic personal style transfer to other images, unlike these conventional technologies.

BRIEF DESCRIPTION OF THE DRAWINGS

Aspects of the disclosure are described in detail below with reference to the attached drawing figures, wherein.

DETAILED DESCRIPTION

Figure 1:
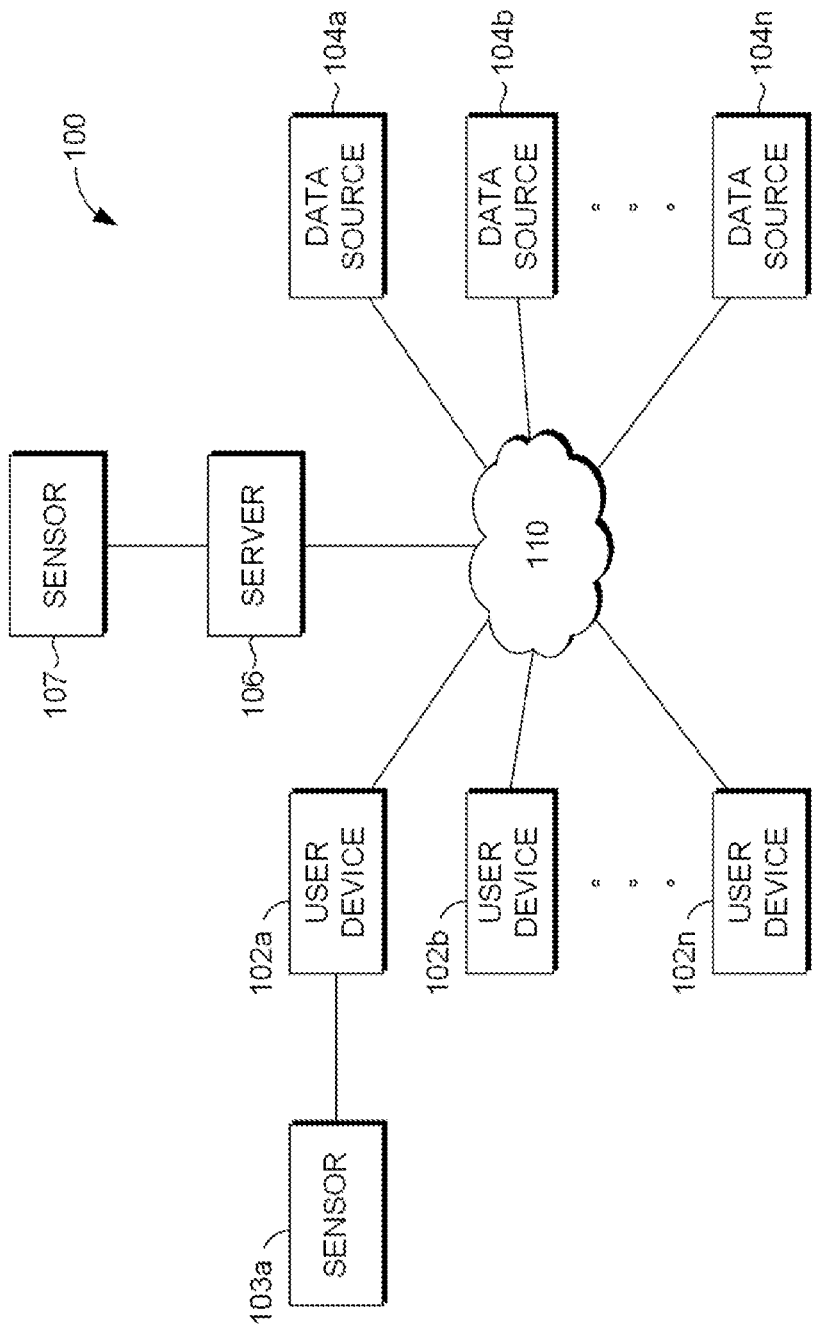
FIG. 1 is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a standalone application, a service or hosted service (standalone or in combination with another hosted service), or a plug-in to another product, to name a few.

Organizations, businesses, or other entities include individuals that are located across different geographical areas. Teleconferencing technologies or other collaboration tools (e.g., MICROSOFT TEAMS®) are an instrumental part of everyday communication among these individuals. For example, business units that include people living in different areas may use video sharing technologies, audio stream technologies, and/or meeting recording technologies to communicate with each other during a meeting. However, each of these technologies has limited capabilities with respect to image filtering. A filter is a software routine that changes the intensity values of content (e.g., color or shading) and/or adds/removes content in an image. For instance, some teleconferencing technologies can apply predetermined filters by changing the background of a video feed from the user's home setting to an artificial exotic outdoor environment.

However, these technologies fail to apply intelligent and useful filtering to data representing users themselves. Users often feel obligated to turn on a video to capture their faces during a meeting or conference call. However, they often do not feel presentable and sometimes they do not meet dress requirements for the particular occasion. Perhaps their makeup has not been applied, their hair has not been styled, they have not shaved, or they are not wearing a presentable shirt, among other things. In a lot of situations, this causes users to turn off the video altogether or even refrain from attending certain meetings. Further, getting ready is time consuming even in video conference meeting settings and users may be late to a meeting if they take the time getting ready. Existing technologies fail to intelligently apply adequate filtering techniques to make users appear as if they got ready for a meeting, even when they did not.

Although some existing technologies can perform filtering of users' facial features, they fail to intelligently capture a user's personal style and perform realistic personal style transfer to other images, such as a meeting-based video feed. For example, certain technologies, such as social media-based filtering tools, can create a predetermined, standardized or universal filter and then apply it on images of people to change their appearance. In an illustrative example, these technologies can apply a generic "glasses" filter over an image of a user, which formulates pixels representing glasses over the eyes of the user. However, these filters are one-size-fits-all filters that are made to be applied to any user regardless of the user's face shape, body shape, hair color, and the like. Other filters that can modify users' image, such as by altering the sizes of users' facial features (e.g., bigger eyes), texture (e.g., smoother skin), or color (e.g., redder lips) result in an overly fake and artificial effect because these changes are not specific to the user, but are standardized, one-size-fits-all type image modifications. All of these existing technologies fail to learn or extract a user's personal style (e.g., specific makeup combination) and then intelligently transfer the personal style to other images of the same (or other) user. Further, these filters fail to look realistic and are inaccurate in the way they apply the filters (e.g., they apply a hat filter, which covers the eyes of a user) based on the filters being a one-size-fits-all filter.

Existing machine learning models are also deficient. Although particular image style transfer machine learning models can apply image styles (e.g., a painting style) to other images, they are destructive and less accurate, among other things. For instance, some deep learning algorithms perform style transfer based on manipulating the node activations of a deep learning model (e.g., iterative gradient descent of Gatys), or doing so in a single forward pass (e.g., AdaIN, Cycle-GAN). What this means is that all the pixel manipulations indicative of various layers of an image effect are aggregated into a single layer. Accordingly, users have no control over any of the pixel manipulations of the image effect. For example, although particular image style transfer technologies can apply a particular foreground color (a first layer) and a particular background color (a second layer) to a photograph, users are not able to modify (e.g., cut, paste, apply brushes) either the first layer or the second layer. Further, these models do not apply realistic filters based on the user's own personal style.

Various aspects of the present disclosure provide one or more technical solutions to these technical problems, as described herein. In operation, various embodiments of the present disclosure apply data indicative of a personal style to a feature of a user based on determining or estimating (e.g., via a machine learning model) the personal style. For instance, embodiments can receive a first image (e.g., a screenshot) or set of images (e.g., a video feed) of a first user that indicates the personal style of the first user, such as a hair style or makeup style of the first user. The first image can then be fed to one or more machine learning models in order to learn and capture the personal style of the first user. For example, particular models (e.g., a modified Generative Adversarial Network (GAN)) can perform several training epochs to learn that the first user always wears blue eyeshadow with blue lipstick at a particular pattern. Subsequently, some embodiments capture the first user in another image or set of images, such as a video feed. Some embodiments can then detect one or more features (e.g., eyes, lips, and the like) of the first user in these other images and based on the determining of the user's personal style in the first image, can apply (e.g., via the modified GAN model) the data indicative of the personal style of the first user to the one or more features of the user in these other images.

Various embodiments of the present disclosure improve existing teleconferencing technologies, video sharing technologies, audio stream technologies, and/or meeting recording technologies. As described above, each of these technologies has limited capabilities with respect to image filtering. However, various embodiments can filter more than the background of a user's environment in a video feed. For example, some embodiments can apply intelligent and useful filtering to users themselves by estimating or determining a user's personal style and then intelligently applying data representing the personal style to other images of the user (or other users). As indicated above, users often feel obligated to turn on a video to capture their faces during a meeting or conference call. However, they often do not feel presentable and sometimes they do not meet dress requirements for the particular occasion. Instead of the user having to manually apply makeup, style their hair, shave, or wear a presentable shirt for every meeting, certain embodiments can automatically learn or estimate the user's personal style in images where they have applied makeup, styled their hair, shaved, or wore a particular shirt. In this way, the user need not manually apply these styles at a later time because these embodiments can intelligently transfer data representing the user's personal style to other images where the user has not employed their personal style.

Figure 8A:
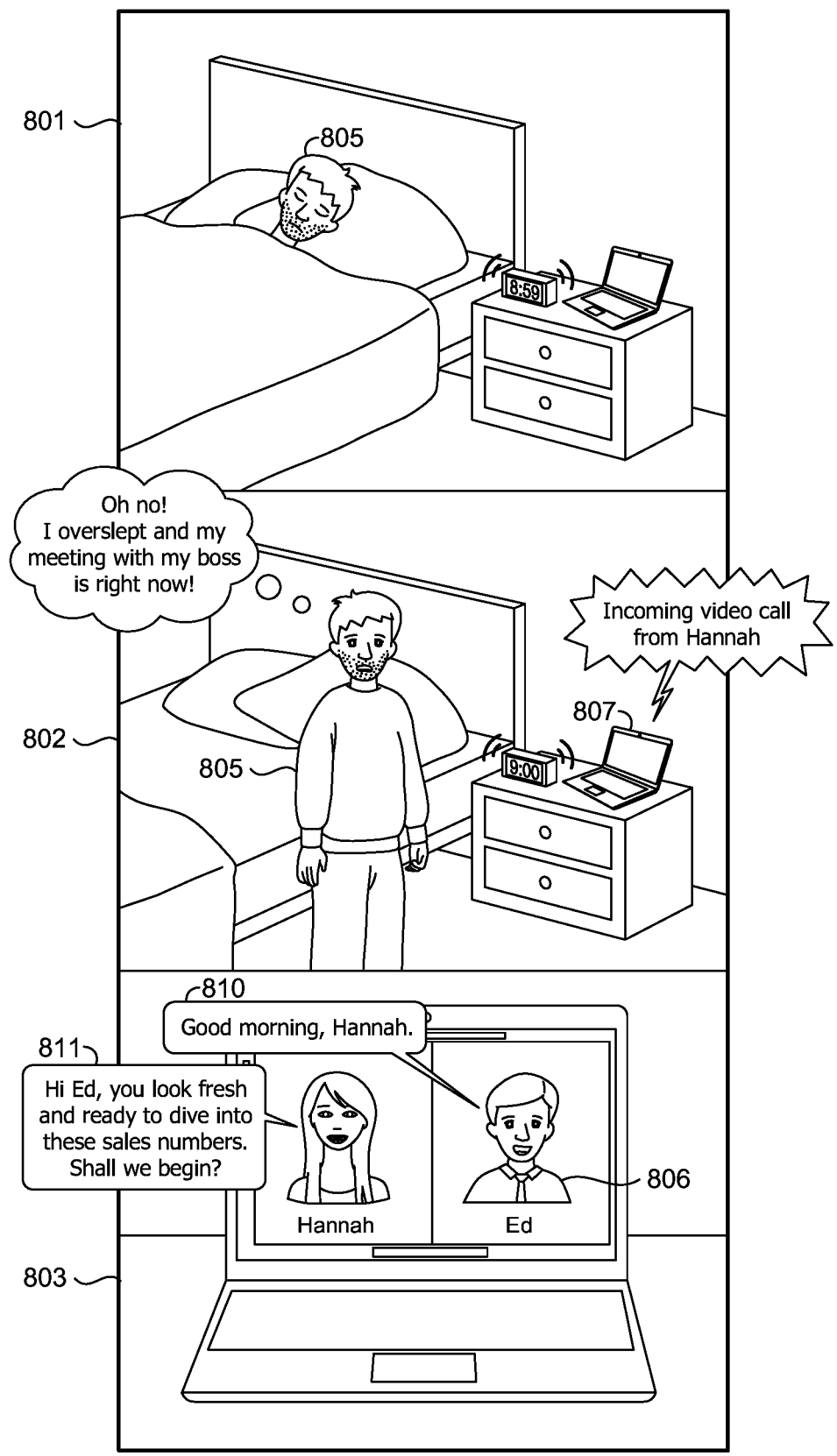
FIGS. 8A, 8B, and 8C illustratively depict example meeting events, in accordance with embodiments of the present disclosure.

For example, perhaps a user woke up late and did not have the time to style their hair. Instead of the user being late to the meeting because of the time it takes to style their hair or instead of streaming a video feed of the disheveled user (e.g., with non-styled hair), embodiments can apply data to the video feed that reflects a previously learned personal style, which would look natural and be of high quality, since the learning is personalized to the user themselves. For instance, referring to FIG. 8A, a series of scenes 801, 802, and 803 are shown depicting this example using for one embodiment of the technologies described herein. As depicted in scene 801, a user 805 (named "Ed") is shown oversleeping with an alarm clock buzzing and the clock indicating that it is nearly 9:00 am. In scene 802, Ed (user 805) springs out of bed in a panic realizing that he has overslept and is about to miss his online meeting with his supervisor, Hannah, who is presently video-calling Ed's computer (807). Ed does not have time to clean up and look more professional and prepared for his boss. Fortunately, Ed can apply a personalized style filter, which may be determined, as described herein, based on one or more images of Ed captured during previous video-conference(s) when he looked more professional. In scene 803, Ed has applied a personalize style, according to an embodiment of this disclosure, and his presented image (806) appears professional and put-together. Ed greets his boss "Good morning, Hannah" (810) and his boss replies, "Hi Ed, you look fresh and ready to dive into these sales numbers! Shall we begin?" (811). Accordingly, users are less likely to be late for meetings, turn off the video all together, or refrain from attending meetings.

Figure 8B:
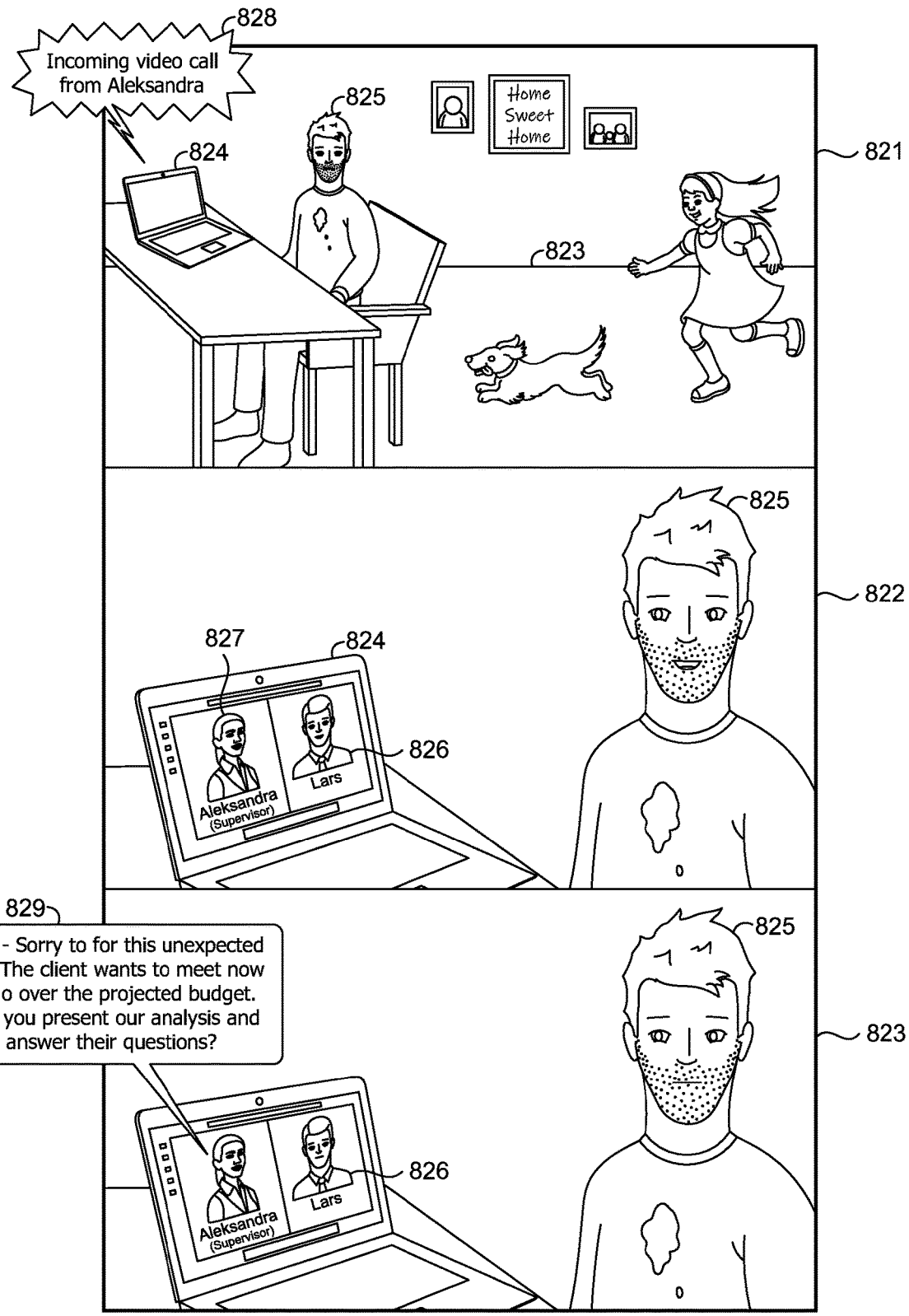
Figure 8C:
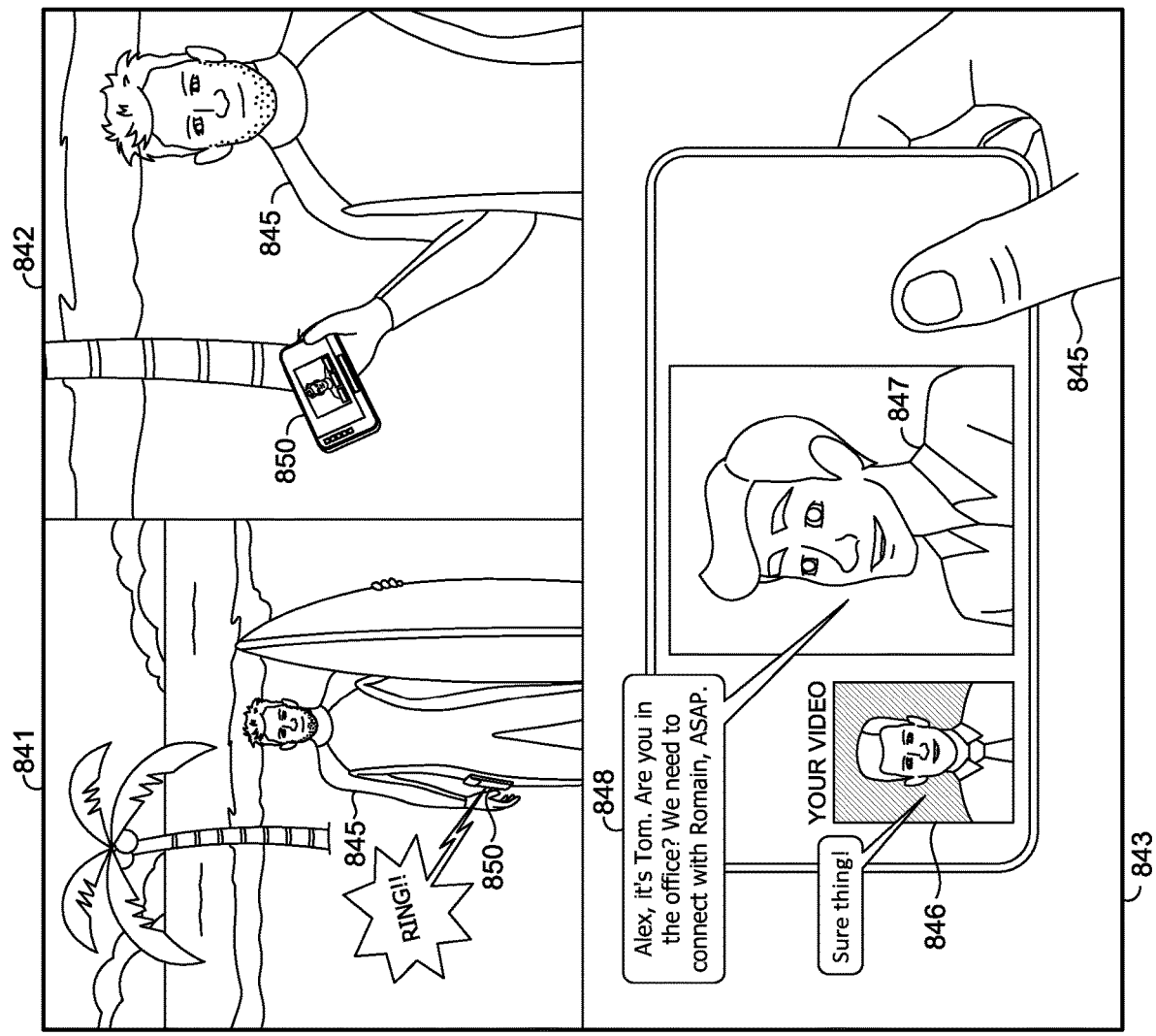

Additional illustrative example embodiments of the technologies described herein are provided in FIGS. 8B and 8C. With reference to FIG. 8B, scene 821 depicts a user (825) named Lars, who is working from home. At the present moment, Lars' working environment (823) is less than ideal, and perhaps due to kids having to stay home from school, a rambunctious dog, and other distractions, Lars (user 825) is a bit of a mess. He appears frazzled and something has spilled on his shirt. Suddenly his laptop computer (824) presents an indication (828) of an incoming video call from his supervisor, Aleksandra. In scene 822, Lars (user 825) has answered the incoming video call and is meeting with his supervisor, Aleksandra (827). Lars (user 825) has applied a personalized style, according to an embodiment of this disclosure, and his presented image (826) appears professional in the video conference when (in scene 823) his supervisor Aleksandra says "Lars—Sorry to for this unexpected call. The client wants to meet now to go over the projected budget. Can you present our analysis and answer their questions?" (829). Therefore, users are less likely to turn off the video all together, or refrain from attending meetings. In this example, in particular, when connecting with a client over video conference, choosing not to turn on video could be detrimental to the interaction between Lars and the client, and potentially negatively impact Lars' and Aleksandra's business.

Turning now to FIG. 8C, a third example is provided of using an embodiment of the technology of this disclosure, which depicts a series of scenes 841, 842, and 843. In scene 841, a user 845 (named Alex) is outside surfing. Alex (user 845) receives a video call on his mobile device (850). In scene 842, Alex (user 845) sees that the incoming call is from his colleague. But Alex may not want his colleague to see that he is surfing, so he applies a personalized style, according to an embodiment of the technologies of this disclosure, via the video-conferencing software on his mobile device (850), and also blurs his video background. In scene 843, Alex begins a video conference with his colleague Tom (847). Alex's video image (846) depicts a professional style that does not make Alex appear as though he is surfing or on the beach. Consequently, Tom (847) greets his colleague asking if Alex is in the office, and tells him that they need to connect with their other colleague Romain, (848). Accordingly, users are more likely to answer video calls and thus be available for impromptu meetings and collaborations with colleagues.

Various embodiments of the present disclosure improve facial filtering technologies by intelligently capturing a user's personal style and performing realistic personal style transfer to other images. Instead of creating a one-size-fits-all predetermined filter and then applying it on images of people to change their appearance, certain embodiments learn or estimate a particular user's personal style. For instance, these embodiments can learn, via a model, a hair style that is specific to a user's face or head shape, or can learn a makeup style specific to the contours of the user's facial geometry. These embodiments can then intelligently transfer or apply the personal style to other images of the same (or other) user by using one or more machine learning models or image style transfer techniques, such as a modified GAN. For example, these modified models can use multiple discriminators that distinguish whether generated images include the personal image style and are real or fake so as to make the output image as realistic as possible, as described in more detail below. The output can be an image of a user with the user's personal style indicated in the image, even though the user may not have applied the user's personal style at the particular occasion in the real world. In this way, filters look realistic and are accurate based on the learning of the personal style and then intelligently applying the personal style, as opposed to applying a one-size-fits-all filter.

Various embodiments also improve existing image style transfer technologies. For example, various embodiments can apply or transfer personal style to images where the personal style is not destructive. That is, in some embodiments, the data indicative of personal style is applied in a procedural manner (in steps or processes) at consumer applications and each individual step can be manipulated to change the intensity (e.g., pixel values) or how much a particular image style is such represented in a rendering. In this way, the user has full control over how much personal style is represented in an image. For example, at a first time a first process can add data indicative of a hair style layer to a source image and the user can subsequently modify (e.g., cut, mask, delete) the data at varying degrees. At a second time subsequent to the first time, a second process can add data indicative of makeup style to the same source image and the user can subsequently modify the data. Accordingly, various embodiments do not aggregate all the pixel manipulations of a personal style into a single pass or layer. Rather, they procedurally add pixel manipulations such that a manipulation can be fully editable by users. Further, particular embodiments are more accurate and realistic than existing models in generating images via style transfer. For example, particular embodiments use multiple discriminators along with a personal style generator in order to apply the optimal amount and location of data representing personal style in images, thereby making the images appear more realistic, as described in more detail below.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 1100 described in connection to FIG. 11, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 9 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n may include target and/or source images. Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors 103a, 107, which may be integrated into or associated with one or more of the user device(s) 102a, 102b, or 102n or server 106.

Figure 2:
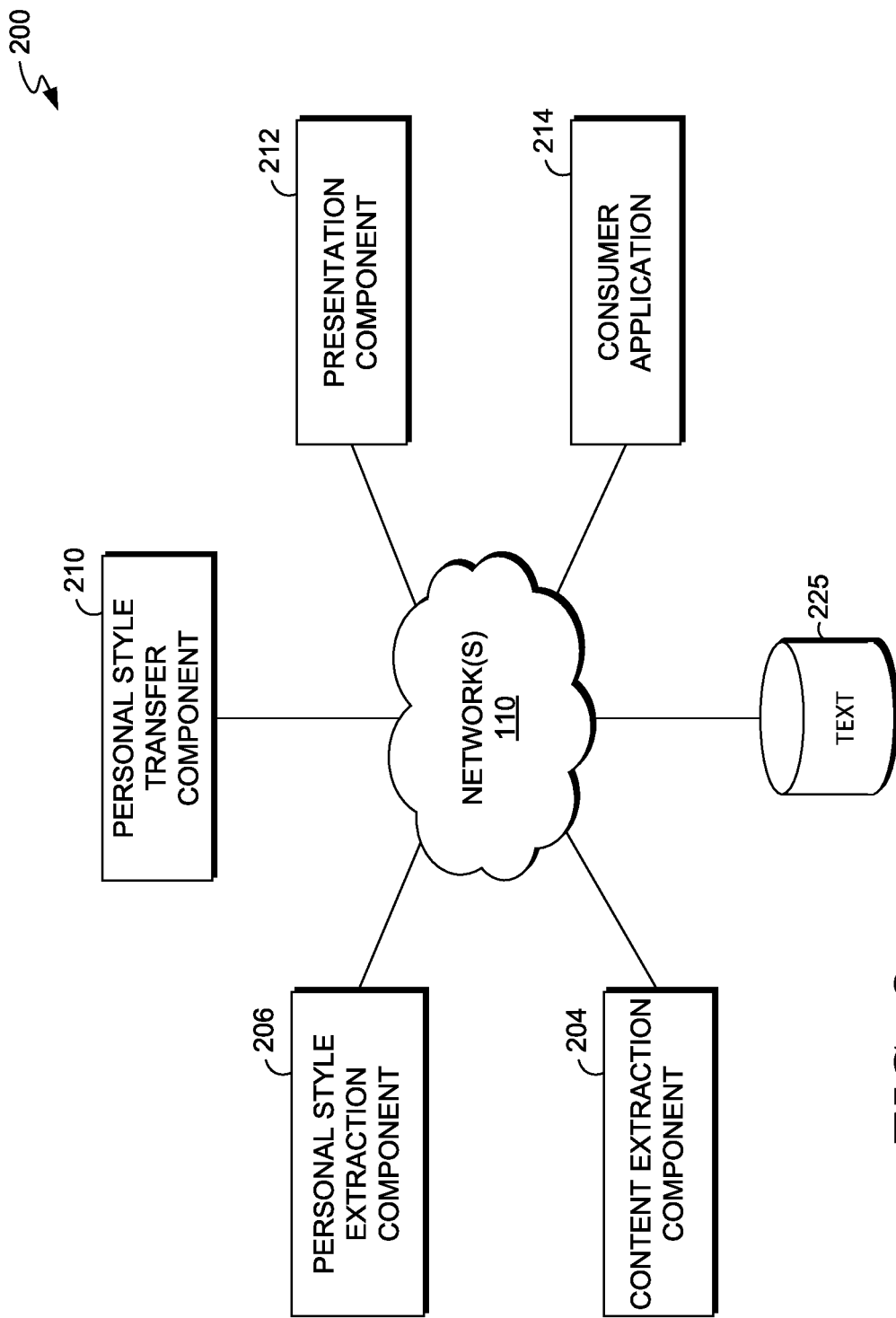
FIG. 2 is a block diagram illustrating an example system architecture for applying data representing a personal style of a user to one or more images, according to some embodiments.

Operating environment 100 can be utilized to implement one or more of the components of the system 200, described in FIG. 2, including components for applying or transferring data indicative of personal style to images. Operating environment 100 also can be utilized for implementing aspects of process flow 600, and/or 700 as described with respect to FIGS. 6 and 7 respectively. Referring now to FIG. 2, with FIG. 1, a block diagram is provided showing aspects of an example computing system architecture suitable for implementing an embodiment of the disclosure and designated generally as system 200. The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including the content extraction component 204, the personal style extraction component 206, the person style transfer component 210, the presentation component 212, the consumer application 211, and storage 225, each of which are communicatively coupled via the one or more networks 110. The system 200 is generally responsible for transferring or applying data representing a personal style of a user to one or more images. These components may be embodied as a set of compiled computer instructions or functions, program modules, computer software services, or an arrangement of processes carried out on one or more computer systems, such as computing device 900 described in connection to FIG. 9 for example.

In some embodiments, the functions performed by components of system 200 are associated with one or more personal assistant applications, services, plugins, extensions, or routines. In particular, such applications, services, plugins, extensions, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, the content extraction component 204 is generally responsible for extracting content from one or more first (and/or second) images of a user. For example, the consumer application 214 may receive an uploaded snapshot or image capture (e.g., a still-image, photo, or video frame) of a user's face and upper torso area and the content extraction component 204 can extract or process the entire snapshot, which includes a set of pixels. In some embodiments, the content extraction component 204 alternatively processes multiple snapshots rather than one. For instance, a user can provide several snapshots at different angles of the user, which the content extraction component 204 can then process. In some implementations, images from other users (e.g., friends of a first user, celebrities, or social media influencers) may be received by content extraction component 204 for use to determine a personalized style for the first user that is influenced by the image(s) from another user, as described herein.

In some embodiments, the content extraction component 204 alternatively or additionally extracts content from one or more video feeds of the user. For example, the content extraction component 204 may receive an indication that a user has selected or otherwise given permission to record the user while the user goes about her usual business. In response to the receiving of this indication, the content extraction component 204 can communicate with an operating system and/or the consumer application 214 in order to cause activation of a web cam or other imaging device to record user actions.

In some embodiments, the time of when data is extracted from these video feeds (or other images) is additionally or alternatively event based or time based. For instance, in event-based embodiments, a web cam can be activated every time the user is on a video call (an event) or otherwise uses the consumer application 214. In another example, in time-based embodiments, the recording of the user can occur for predetermined time intervals, such as 2 minutes a day, or for 5 minutes during a video conference.

In some embodiments, the content extraction component 204 only extracts a subset of data from one or more images and anonymizes other parts of the same images so as to preserve user privacy. Such data extraction can be based on predefined rules and/or model functionality. For example, a conditional rule dataset may indicate to only detect and extract data indicative of the user's hair, makeup, shirt, and/or the like in order to preserve privacy of the user's facial characteristics. Accordingly, in some embodiments, the content extraction component 204 can, for example, only extract and store data corresponding to a user's hair but also encrypt, obfuscate, mask, or otherwise conceal data indicative of the user's eyes, nose, mouth or other facial features. Such detection can be based on user machine learning model (e.g., a convolutional neural network (CNN)) to identify certain features of a user. For example, certain embodiments can use computer vision functionality that performs object detection via using bounding boxes.

In an illustrative example of object detection functionality, particular embodiments use one or more machine learning models (e.g., a CNN) to generate a bounding box that defines the boundaries and encompasses a computer object representing a feature (e.g., a nose, eyes, hair, torso, etc.) of an image. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents. In an illustrative example, in a first image, a first bounding box can be generated over a person's nose and labeled as "nose 1", a second bounding box can be generated over the same person's eyes and be labelled as "eyes."

The personal style extraction component 206 is generally responsible for determining or learning a user's personal style from the content extracted by the content extraction component 204. In some embodiments, the user's "personal style" refers to the manner or way in which content of a user is presented in an image, as opposed to the content itself. For example, personal style may not refer to the user's hair, but the way the user styles their hair. In another example, personal style may not refer to the makeup, but the color, type, texture, or the amount of makeup the user applies. Personal style may additionally or alternatively refer to the accessories a user wears, such as particular earrings, necklaces, bracelets. In some embodiments, personal style refers to the shading, texture, lighting or any other effect on all objects in an image of a user. In various instances, any objects detected or detectable (e.g., via an object recognition component) in an image correspond to the content or payload of an image, whereas the pattern of all actual pixel values in an image (or selected portion(s) of the target image) correspond to the image style.

It is understood that sometimes data representing content payloads and data representing personal style are not completely disentangled. Accordingly, in some embodiments where neural networks are used, "personal style" additionally or alternatively refers to the feature correlations of lower layers of a neural network. The higher layers in a neural network capture the high-level content in terms of objects and their arrangement in an image but do not strictly constrain the exact pixel values (e.g., the waviness of hair) of the reconstruction. In contrast, reconstructions from the lower layers reproduce the exact pixel values of an image—e.g., the personal style.

In some embodiments, the personal style extraction component 206 determines personal style by taking the delta between images of a user that is incorporating her personal style verses images of the user when the user is not incorporating her personal style when the environment or background is the same. For example, some embodiments can receive various photos of users without makeup (or other personal style feature) labeled as "without makeup" and various photos of users with makeup labeled as "makeup" and compare the two. In an illustrative example, a machine learning model can convert or encode each set of pixel value as a feature vector (or set of feature vectors), which represent the pixel values of each image. Embodiments can then determine a distance (e.g., a Euclidian or Cosine distance) between the feature vectors to identify features (e.g., red lipstick) responsible for the label.

In some embodiments, however, the background or environment between images are different, which requires additional pre-processing. This can be the case when the user does not present before and after photos in the same environment, as described above. Rather, embodiments may only train on or process images of users with their personalized style. Accordingly, when new or output images (e.g., a video feed) of a user are received, before the delta is determined between images, pre-processing can occur to remove any biases. For instance, various embodiments can adapt the environment or background between the images by normalizing via aligning resolution or lighting between the images such that they are similar or within a threshold value. For example, a background of a first image may be light green, whereas the background of a second image may be black. In these instances, both backgrounds may be filtered by changing the pixel intensity to the same values (e.g., a gray color) so that embodiments do not inadvertently generate false positives or make personal style determinations based on the background of an image.

In some embodiments, the personal style extraction component 206 need not determine a delta between pictures, but can rather use a single picture or snapshot the user likes. In these embodiments, the personal style extraction component 206 can determine a personal style from a single picture. In some embodiments, extracting personal style using a single image is done by style transfer techniques to first extract style. For example, the personal style extraction component 206 can use a CNN and feature space designed to capture texture information. This feature space can be built on top of filter responses (e.g., filtered images in a CNN) in any layer of a neural network. The feature space may indicate correlations between the different filter responses, where the expectation is taken over the spatial extent of the feature maps. In some embodiments, these feature correlations are given by the Gram matrix $G^l \in R^{N_l \times N_l}$ where $G_{ij}^l$ is the inner product between the vectorized feature maps i and j in layer l:

$$G_{ij}^l = \sum_k F_{ik}^l F_{jk}^l.$$

By including the feature correlations of multiple layers, a stationary, multi-scale representation of the input image can be received, which captures its texture information (e.g., the style of the lines in a hair style) but not the global arrangement or objects or content of the image (e.g., the head object itself that the hair is on). Accordingly, particular embodiments construct an image that matches the style representation of a given target image. In various embodiments, this is done by using gradient descent from a white noise image to minimize the mean-squared distance between the entries of the Gram matrices from the original image and the Gram matrices of the image to be generated.

In various embodiments, $\bar{a}$ and $\bar{x}$ can represent the target image and the image that is generated, and $A^l$ and $G^l$ their respective personal style representation in layer l. The contribution of layer l to the total loss is then $$E_l = \frac{1}{4N_l^2 M_l^2} \sum_{i,j} (G_{ij}^l - A_{ij}^l)^2$$

and the total personal style loss is $$\mathcal{L}_{style}(\bar{a}, \bar{x}) = \sum_{l=0}^{L} \omega_l E_l,$$

where $\omega_l$ are weighting factors of the contribution of each layer to the total loss (see below for specific values of $\omega_l$ in our results). The derivative of $E_l$ with respect to the activations in layer may be computed analytically:

$$\frac{\partial E_l}{\partial F_{ij}^l} = \begin{cases} \frac{1}{N_l^2 M_l^2} \left( (F^l)^T (G^l - A^l) \right)_{ji} & \text{if } F_{ij}^l > 0 \\ 0 & \text{if } F_{ij}^l > 0 \end{cases}.$$

The gradients of $E_l$ with respect to the pixel values $\bar{x}$ can be readily computed using error back-propagation.

In some embodiments, personal style extraction component 206 uses one or more machine learning models to learn features between labelled (or non-labeled) images to minimize a loss when making distance determinations. For example, features for images labeled as certain personal styles (e.g., "hair style #1") can be learned in regression models or classification models to determine whether users employ certain personal styles in images. Particular machine learning models are described in more detail below.

The personal style transfer component 210 is generally responsible for applying data that indicates or represents the personal style extracted via the personal style extraction component 206 to one or more images. Such personalized style transfer of data may happen to images (e.g., source images) other than those processed via the content extraction component 204. For example, some embodiments apply data representing a makeup style (e.g., color and density of lipstick) extracted from a snapshot to a video feed of a user not wearing makeup such that it appears, from the user's perspective, that the user is wearing makeup in the video feed.

The personal style transfer component 210 can apply data representing the personal style using any suitable method, such as a GAN machine learning model, as described in more detail below. However, any suitable technique can be used. For example, the personal style transfer component 210 can generate a face mesh that represents the user and the personal style transfer component 210 can then detect certain objects (e.g., via object detection) and then render the data representing the personal style to corresponding features representing the user. In some embodiments, feature detection is done via homography-based functionality. A "homography" refers to a transformation data element or structure (e.g., a 3×3 matrix) that maps points in one image (e.g., a target image) to corresponding points in another image (e.g., a source image). For example, a first set of pixels representing a nose of a target image can be mapped to a second set of pixels representing the same nose in a source image. In this way, pixels in different images representing the same object can be identified. Such homography mapping can be performed as follows:

$$H = \begin{bmatrix} h_{00} & h_{01} & h_{02} \\ h_{10} & h_{11} & h_{12} \\ h_{20} & h_{21} & h_{22} \end{bmatrix}$$

For a first set of corresponding points $(X_1, Y_1)$, in a target image, and $(X_2, Y_2)$, in a source image, then homography H, in particular embodiments, maps the corresponding points in the following way:

$$\begin{bmatrix} x_1 \\ y_1 \\ 1 \end{bmatrix} = H \begin{bmatrix} x_2 \\ y_2 \\ 1 \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_2 \\ y_2 \\ 1 \end{bmatrix}$$

In some embodiments, in order to generate this mapping, machine learning models, such as a first deep learning model (e.g., a OANet CNN) can be used. In various embodiments, the terms "deep embedding neural network," "deep learning model," "deep neural network," "deep network," or the like refers to one or more machine learning algorithms that use multiple layers to extract features from input. In most cases, a deep network refers to a specific type of neural network machine learning model is capable of embedding feature vectors representing features in feature space based on similarity or distance (e.g., Euclidian distance, cosine distance, Hamming distance, etc.). For example, these terms can refer to a Convolutional Neural Network (CNN) (e.g., an inception v3 model), Recurrent Neural Networks (RNN) (e.g., LSTM), Recursive Neural Networks, Unsupervised Pretrained Networks (e.g., Deep belief Networks (DBN), or the like. Certain CNNs can efficiently establish the correspondences between a target image and one or more source images so that data representing personal style in a target image can be applied to corresponding features in a source image. It is understood that homographies are representative only, and that alternative functionality or data may be determined to map or match features between target and source images. For example, instead of defining projective space through homographies, the projective space can be defined through a set of axioms, lines (e.g., line segments), collineations (e.g., projective collineations), or other data elements, which do not explicitly involve any field (e.g., synthetic geometry).

In some embodiments, mapping the user's personal style to other images can be a difficult problem, when source images are video feeds, as there may be a continuous change in pixel orientations or filter values (e.g., due to the user switching positions, changing facial expressions, and the like). Accordingly, one or more additional time-based models can be used to predict what the personal style of a user will be at a future time sequence, such as a Hidden Markov Model (HMM) and/or a Gaussian Mixture Model (GMM). For example, in some embodiments, the personal style transfer component 210 uses an HMM to train on one or more target images. An HMM is a computing tool for representing probability distributions (e.g., the probability that data representing a personal style will be at the same intensity and/or orientation) over sequences of observations (e.g., a continuous video feed of a user that has employed a personal style and who has changed positions). These tools model time series data. For example, at a first time window, a user may smile, which shows lipstick as indicated as a first set of pixels. Later, the user may frown, thereby changing the first set of pixels to a second set of pixels. Embodiments can thus predict the orientation or value of the second set of pixels based on prior (or learned) patterns.

HMMs augment the Markov chain. The Markov chain is a model that provides insight about the probabilities of sequences of random variables, or states, each of which take on values from a set of data. An assumption with Markov chains is that any prediction is based on the current state, as opposed to states before the current state. States before the current state can have no impact on the future state. HMMs can be useful for analyzing video sequence data because images of users tend to fluctuate (e.g., depending on mood) and do not necessarily depend on prior utterances before a current state (e.g., a current window of 10 seconds of a video feed). In various cases, events of interest or features are hidden in that they cannot be observed directly. For example, events of interest that are hidden can be the identity or class of personal styles from one time sequence to another. Although personal style data input data are directly observed, the identity or classification of the personal style is not known (i.e., is hidden).

An HMM allows the model to use both observed events (e.g., a personal style sample) and hidden events (e.g., a pixel value or orientation of the personal style at a future time) that are essentially causal factors in a probability algorithm. An HMM is represented by the following components: a set of N states $Q=q_1q_2 \ldots q_N$, a transition probability matrix $AA=a_{11} \ldots a_{ij} \ldots a_{NN}$, each $a_{ij}$ representing the probability of moving from state i to state j, s.t. $\Sigma_{j=1}^{N} a_{ij}=1 \forall i$, a sequence of T observations $O=o_1o_2 \ldots o_T$, each one drawn from a vocabulary $V=v_1, v_2, \ldots v_T$, a sequence of observation likelihoods $B=b_i(o_t)$, also called emission probabilities, each expressing the probability of an observation of being generated from a state i and an initial probability distribution $\pi=\pi_1\pi_2 \ldots \pi_N$ over states. $\pi_i$ is the probability that the Markov chain will start in state i. Some states j may have $\pi_j=0$, meaning that they cannot be initial states.

The probability of a particular state (e.g., a pixel value and/or orientation of a particular lipstick style) depends only on the previous state, thus introducing the Markov Assumption: $P(q_i|q_1 \ldots q_{i-1})=P(q_i|q_{i-1})$. The probability of an output observation $o_i$ depends only on the state that produced the observation $q_i$ and not on any other states or any other observations, thus leading to output independence $O(o_i|q_1 \ldots q_i \ldots qr, o_1, \ldots, o_i, \ldots o_T)=P(o_i|q_i)$. This allows a component to state that given observations o (e.g., pixel values and orientations of pixels around the mouth), the algorithm can find the hidden sequence of Q states (e.g., the predicted pixel values and orientations).

In various embodiments, a HMM or other model is provided for each user (e.g., of an organization) to train on their everyday calls or other video samples in order to "learn" their particular personalized style (e.g., by learning the hidden variables of an HMM). Some embodiments re-train the video model after every new call (or voice input sample ingested), which enables embodiments to continuously improve a user's video model. Some embodiments alternatively or additionally use other models, such as LSTMs and/or GMMs, which are each described in more detail herein.

Example system 200 also includes a presentation component 212 that is generally responsible for presenting content and related information to a user, such as source images that include data representing a persona style of a user. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, and/or other user data, presentation component 220 may determine on which user device(s) content is presented, as well as the context of the presentation, such as how (or in what format and how much content, which can be dependent on the user device or context) it is presented, when it is presented. In particular, in some embodiments, presentation component 220 applies content logic to device features, or sensed user data to determine aspects of content presentation.

In some embodiments, presentation component 220 generates user interface features associated with a computer object generated by the composite view object generator 280 and/or the associated computer resource. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

In some embodiments, a personal assistant service or application operating in conjunction with presentation component 220 determines when and how (e.g., presenting only sharing gestures and/or contextual data as opposed to an entire meeting transcript) to present the content. In such embodiments, the content, including content logic, may be understood as a recommendation to the presentation component 220 (and/or personal assistant service or application) for when and how to present the notification, which may be overridden by the personal assistant application or presentation component 220.

Continuing with FIG. 2, as described previously, example system 200 may include or operate in conjunction with one or more consumer applications 290. Consumer applications 290 generally refers to one or more computer applications or services, such as online/cloud applications or locally stored applications that consume or utilize the computer objects or computer resources determined by system 200. In particular, a consumer application 290 may receive a sharing gesture for a group, and present, manage, or schedule aspects (e.g., contextual data) of the sharing gesture to the group. In some embodiments, a consumer application 290 may utilize the presentation component 220 to provide a computer object generated by the composite view object generator 280 to a user within a particular group. Examples of consumer applications 290 may include, without limitation, computer applications or services for facilitating meetings or communications (e.g., MICROSOFT TEAMS®, MICROSOFT DYNAMICS®); email, messaging, chat, or calling; project management; calendar or scheduling.

Example system 200 also includes storage 225. Storage 225 generally stores information including data, data structures, computer instructions (e.g., software program instructions, routines, or services), and/or models (e.g., machine learning models) used in some embodiments of the technologies described herein. In an embodiment, storage 225 comprises a data store (or computer data memory). Further, although depicted as a single data store component, storage 225 may be embodied as one or more data stores (e.g., a distributed storage network) or may be in the cloud. Storage 225 includes the group profile 240.

Figure 3:
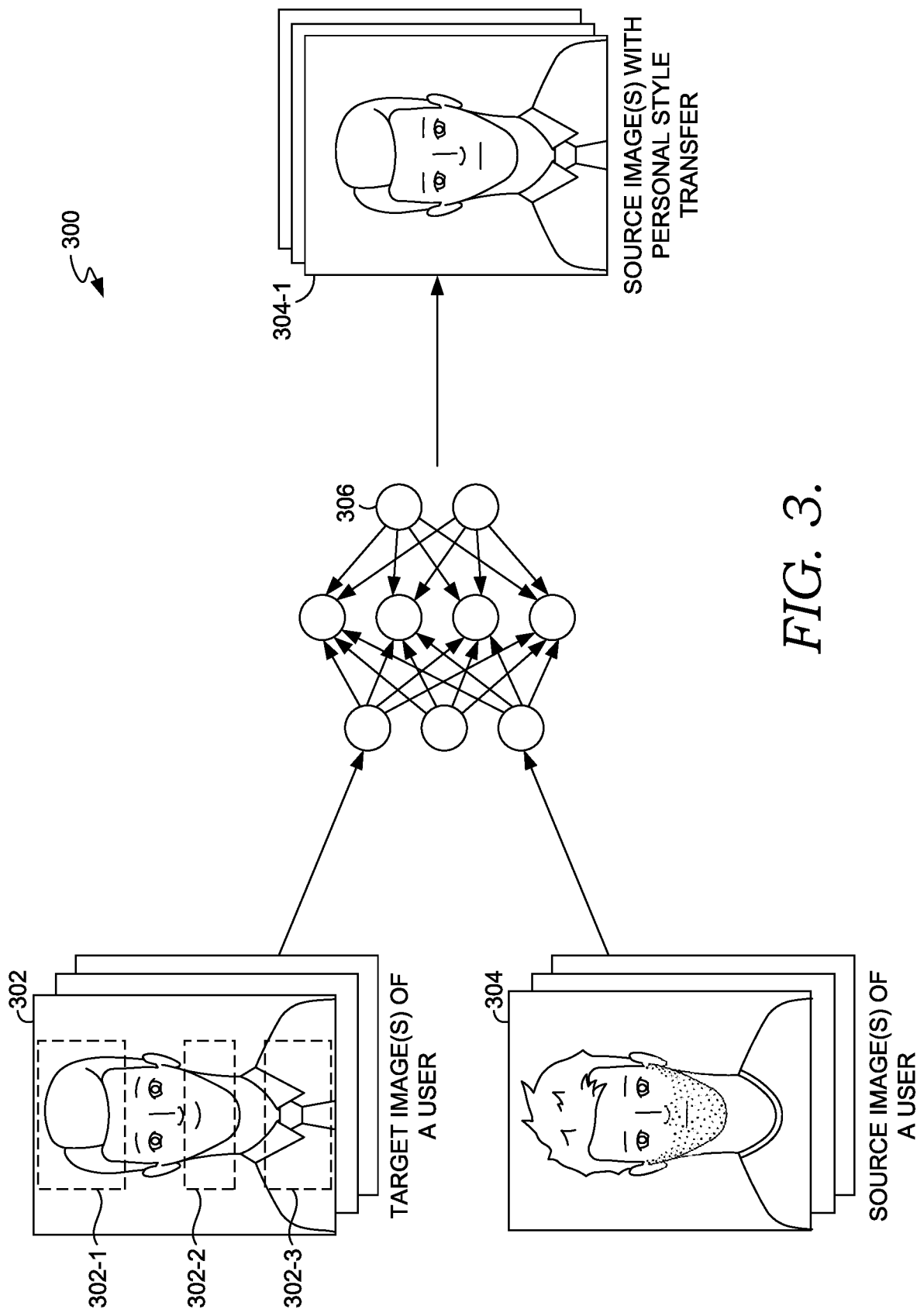
FIG. 3 is a schematic diagram illustrating how the personal style of a user from one or more target images is transferred to the same user in one or more source images, according to some embodiments.

FIG. 3 is a schematic diagram illustrating how the personal style of a user from one or more target images is transferred to the same (or other) user in one or more source images, according to some embodiments. In some embodiments, a "target image" is any image from which a personal style (or features indicative of a personal style) is extracted from. In various instances, the target image includes data representing personal style that is the target for which particular embodiments apply or transfer to other images, such as a source image. An "image" as described herein is a visual representation of one or more portions of the real world. For example, an image can be a digital photograph, a digital image among a sequence of video segments or feed, a graphic image file (e.g., JPEG, PNG, etc.), a picture (or sub-element of a picture), and/or a bitmap among other things. In some embodiments, a "source image" is any image that data representing one or more personal styles from one or more target images are applied to or superimposed over.

At a first time, the one or more machine learning models can be fed (e.g., via the content extraction component 204) the one or more target images 302 (or one or more portions of the target image(s) 302) of a first user. In this example embodiment, the one or more target images 302 includes data indicative of three personal styles—the hair style 302-1, a clean-shaven face 302-2, and a shirt style 302-3. In some embodiments, the one or more target images 302 include images of the first user without the personal styles, similar to, for example, the one or more source images 304 of a user. For example, the user may have messy hair, a T-shirt, or may have facial hair. In this way, the one or more machine learning models 306 can learn the user's personal style, as described, for example, with respect to the personal style extraction component 206. In some embodiments, the one or more target images 302 include at least one image of a different user or person (e.g., a friend, celebrity, or social media influencer) than the user of the source images, such that the one or more machine learning models 306 learn a style that is influenced by the image of the different user.

Responsive to the one or more target images 302 being fed to the one or more machine learning models 306, the one or more machine learning models 306 learn (e.g., as described with respect to the personal style extraction component 206) a user's personal style. Subsequent to this learning, fine-tuning, testing, and/or model deployment, the one or more machine learning models receive one or more source images 306 (e.g., a video feed) of the user, except that the user is not exhibiting any of the personal style features they exhibited in the one or more target images 302. For instance, the user has a beard instead of being clean shaven. The user's hair is not styled, and the user is wearing a T-shirt, instead of a dress shirt and tie.

In response to the one or more machine learning models being fed the one or more source images 304, the one or more machine learning models at least predict the coordinates or area (e.g., via the personal style transfer component 210) to apply data indicative of the personal styles 302-1, 302-2, and 302-3 within the one or more source images 304. In some embodiments, the one or more machine learning models 306 also predict whether the user, within the one or more source images 304, is employing or expressing one or more of his personal styles as indicated in the one or more source images 302. And based on this prediction, the one or more personal styles are automatically applied to the one or more source images 304, as indicated in 304-1. For example, the one or more machine learning models 306 can predict, via a distance determination, that a feature vector representing hair (e.g., as detected via object detection) in the one or more source images 304 is outside of a distance threshold relative to a feature vector representing the hair style 302-1. Responsively, the one or more machine learning models 306 can apply the data indicating the hair style to the source image(s), as indicated in 304-1. The same can be repeated for all features.

In various embodiments, the one or more machine learning models 306 are used to additionally or alternatively apply data indicating the personal styles 302-1, 302-2, and 302-3 to the user in the one or more source images 304, as illustrated in 304-1, as described in more detail below.

Figure 4:
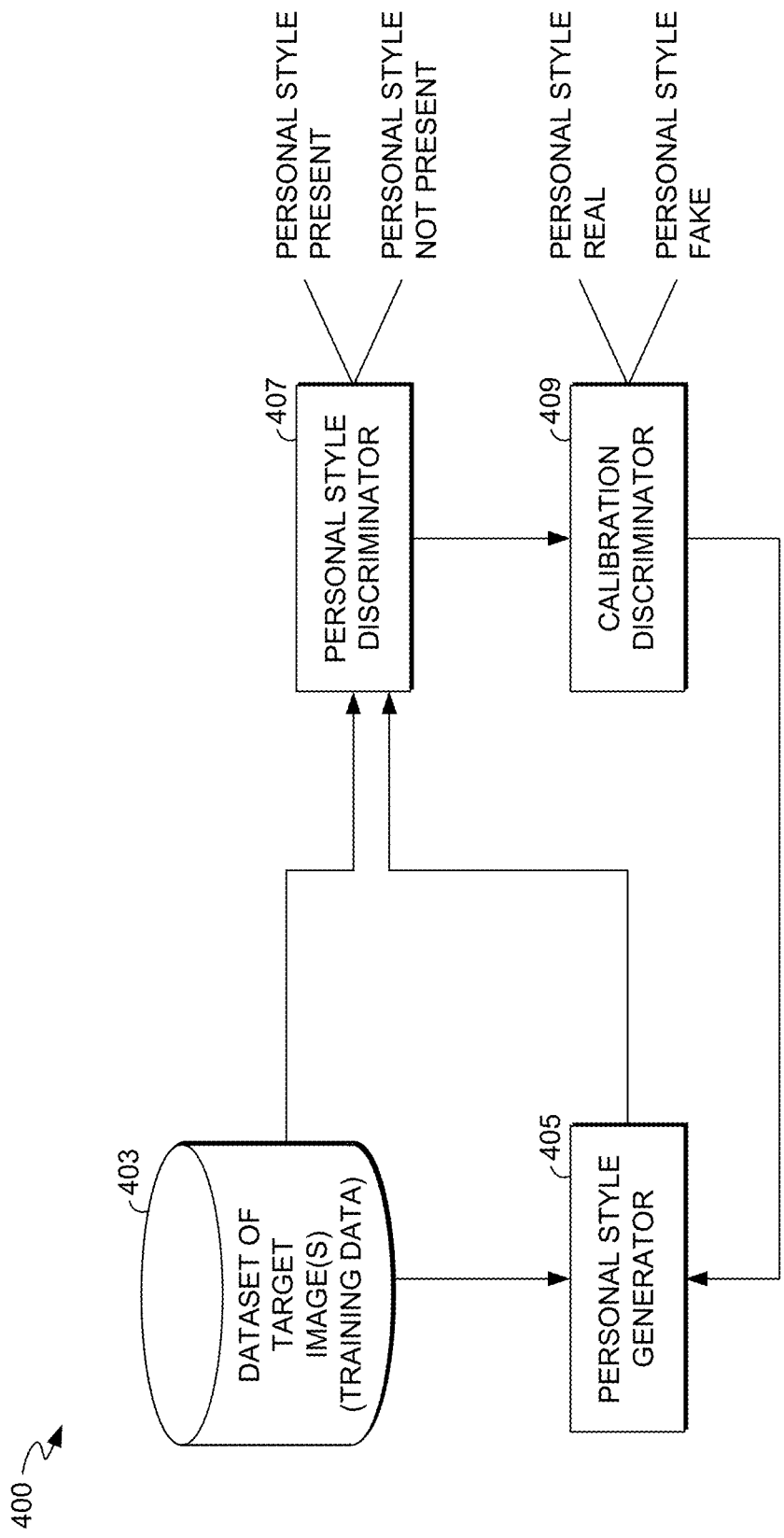
FIG. 4 is a schematic diagram of a modified Generative Adversarial Network (GAN) for use in applying data representing personal style to one or more images, according to some embodiments.

FIG. 4 is a schematic diagram of a modified Generative Adversarial Network (GAN) 400 for use in applying data representing personal style to one or more images, according to some embodiments. The modified GAN includes a set of neural networks—the personal style generator 405 (a first neural network), the personal style discriminator 407 (a second neural network), and the calibration discriminator 909 (a third neural network)—and a dataset of target image(s) 403. In some embodiments, the personal style extraction component 206 and/or the personal style transfer component 210 of FIG. 2 uses or represents the modified GAN 400.

The personal style generator 405 is generally responsible for iteratively generating synthetic or "fake" images until a fake image is selected for the output by meeting one or more certain thresholds set by the personal style discriminator 407 and the calibration discriminator 409. The personal style generator 405 iteratively and incrementally generates data indicative of a personal style of a user until it fools (e.g., is within a threshold pixel value/orientation threshold set by) the personal style discriminator 407 and the calibration discriminator 409, at which point the corresponding image is outputted, such as in a source image video feed. For example, the personal style generator 405 can take, as input, a "no makeup" (or other personal style) data set within the dataset of target image(s) 403 and apply data indicative of makeup to the user.

In generating these fake images, the personal style generator 405 learns the distribution of classes or clusters that represent specific personal styles of the dataset of target images 403. For example, the personal style generator 405 is trained on the dataset of target images 403, where target images can be labeled as "fake" (1) or "real" (0) and/or "styled hair" (1) or "not styled hair" (0) (or other personal style, such as beard or no beard, or shirt X versus no shirt X). The personal style generator 405 can then learn feature associated with each of these labels so that it knows how to iteratively apply data indicative of particular personal styles of the user and at particular quantities (so that the personal style does not appear fake in images).

In some embodiments, the personal style generator 405 is built by selecting an input Z, which may be a random number between 0 and 1 (e.g., 0.7). This input may be a feature vector that comes from a fixed distribution. Z may then be multiplied by each learned weight, which indicates the learned feature or pixel values and pixel value orientations (coordinates) for the particular image style and/or whether or not the particular image style is real. In some embodiments, each pixel in an image is represented by a value (e.g., from 0 to 1), where the value itself and the orientation of the pixels are representative of whether or not there are certain personal styles present (and/or how much data representing the personal style is present). In this way, the personal style generator 405 can incrementally, for example, adjust individual pixel values (along with sigmoid) until these values fool the personal style discriminator 407 and/or the calibration discriminator 409 by generating pixel values and/or positions within an acceptable threshold or range that the discriminators are aware of. At a high level, what this means is that a well-trained personal style generator 405 will always generate images with a user's personal style but may do so with varying degrees of pixel values.

The personal style discriminator 407 is generally responsible for determining, predicting, or estimating whether the images generated by the personal style generator 405 contain the user's personal style or not (e.g., makeup versus no makeup) based on comparing the fake images to the dataset of target images 403. For instance, the dataset of target images 403 may include a first dataset where each image includes the user's personal style and a second dataset where each image does not include the user's personal style. In some embodiments, the personal style discriminator 407 determines whether an image generated by the personal style 405 comes from the first data set or the second dataset (even though it is a fake image).

The calibration discriminator 409 is generally responsible for determining, predicting, or estimating whether the personal style indicated in the fake images are real (i.e., are ones located in the dataset of target image(s) 403) or fake (i.e., are generated by the personal style generator 405). As described above, this can be based on comparing the fake images generated by the personal style generator 405 to the dataset of target images 403. For example, although an image generated by the personal style generator 405 contains data indicating eye liner of a user, other images in the dataset located in 403 may indicate that the data representing the eye liner is much darker than in the fake images. Accordingly, the calibration discriminator 409 may determine that the personal style is fake or does not come from the dataset of target image(s) 403. Such comparison by the personal style discriminator 407 and the calibration discriminator 409 can be based on determining the distance (e.g., Euclidian) between feature vectors representing specific personal styles, for example, In some embodiments, the determination of whether a personal style is real or fake includes determining whether the pixels are outside of an orientation or position threshold. For example, if pixel values representing lipstick is applied, by the personal style generator 405, to an image and placed in a location indicative of a user's nose, this can be outside of a position threshold (e.g., as determined via homography-based functionality or object detection), and the calibration discriminator 409 can thus determine that the image style is fake (e.g., based on the images in the dataset of target images 403 differing over a distance threshold) Alternatively or additionally, in some embodiments, the determination of whether a personal style is real or not includes determining whether a pixel value generated by the personal style generator 405 is outside of a color or brightness threshold. For example, a pixel value may be indicative of an albedo or color that is over a brightness threshold (e.g., based on the images in the dataset of target images 403 differing over a distance threshold).

Alternatively, or additionally, in some embodiments, the determination of whether a personal style is real or fake includes determining whether a pixel value is outside of a resolution threshold (e.g., relative to other pixels of the same image or based on the images in the dataset of target images 403 differing over a distance threshold). For example, pixel values representing lipstick personal style and as generated by the personal style generator 405 may be grainy at a low resolution, whereas the user's face that the lipstick is applied to in the same image may be clear at a high-resolution value. Accordingly, the calibration discriminator 409 can determine that the lipstick is fake.

Alternatively, or additionally, in some embodiments, the determination of whether a personal style is real or fake includes determining whether pixel values representing reflectance properties of a personal style outside of a threshold (e.g., relative to other pixel values representing the user in the same image or based on the images in the dataset of target images 403 differing over a distance threshold). For example, some embodiments, use machine learning models to capture the real word facial or other body surface's Spatially-varying Bidirectional Reflectance Distribution Function (SVBRDF). A Bidirectional Distribution Function (BRDF) is a function used to describe the reflectance properties of a real-world object surface (or how light interacts with a surface). "Spatially-varying" BRDF means that reflectance properties change across a surface depending on the position of the corresponding object in relation to a natural light source, which affects the lighting (e.g., intensity, absorption, or scattering), the color of the object, the texture of the object, or other geometric features of the object (e.g., roughness, glossiness, etc.). Models, such as U-nets, or GANS, can capture the BRDF of pixel values representing a personal style of a user and then compare those with pixel values representing the rest of the user's face or other body part of the same image. If there is a discrepancy outside of a threshold, then the calibration discriminator 409 can determine that the personal style is fake. For example, pixels representing highlights on a person's face may be in a different orientation or value relative to highlights in a person's hair of the same image, indicating that the light source is different between the hair and the face. Based on this inconsistency, the calibration discriminator 409 can determine that the hair or hair style is fake.

In some embodiments, the discriminator 409 and/or the calibration discriminator 409 adds values representing individual pixel values at a specific orientation indicative of personal style and subtracts values representing pixel values at a specific orientation indicative of non-personal style. Various embodiments can then set any suitable threshold value to indicate whether a certain personal style is real/not real or whether a certain style is present. For example, if the summed values are greater than or equal to 1, the user's lipstick may be present relative to values less than 1, which may mean lipstick is not present. In neural networks, and in some embodiments, each neural network node represents a particular pixel of an image and its value. In this way, and using the example above, all the pixel values can be multiplied or added by plus 1 (e.g., a personal style present) or −1 (e.g., a personal style not present) for a final aggregation score. Some embodiments use a sigmoid function (a function that converts high numbers to numbers close to 1 and low numbers to numbers close to 0) to get a sigmoid of the output, which represents the probability that a personal style has been applied/is present or is fake.

Various embodiments train the modified GAN 400 to get the best possible weights (e.g., values that closely resemble pixel values of corresponding personal style). This can be done via an error function (e.g., log loss or cross entropy loss), which a mechanism to tell the modified GAN 400 how it is performing. If the error is large, the modified GAN 400 is not performing well and therefore performs more training epochs until it improves. For instance, if the ground truth represented by a label 1 indicative of a certain personal style, and a prediction is made of 0.1, when it was supposed to be around 1, retraining may occur.

In some embodiments, training occurs via backpropagation by calculating the prediction and then error of that prediction. Then embodiments can take the derivative of the error based on the weights using, for example, the chain rule. This tells the model the quantity or magnitude each weight should be adjusted in order to best decrease the error using gradient descent. In response to this process, the personal style generator 405, the personal style discriminator 407, and the calibration discriminator 409 can be trained. Suitable error functions can be placed in suitable locations. At a first training forward pass, the weights can be defined as random numbers. Then Z can be generated, which serves as an input to the personal style generator 405. As embodiments perform the first forward pass on the personal style generator 405, the output image may likely be fake or not indicative of a user's personal style since the weights are random. Various embodiments pass this generated image through the personal style discriminator 407 and 409. These discriminators output a probability to define the correct error functions. For example, if the label of a generated image is 0 (e.g., no personal style), but the personal style discriminator 407 makes a prediction 0.54, this means that the personal style discriminator 407 is not highly confident that the image does not contain the personal image style. Responsively, an error loss function (e.g., log loss) can be applied to get the prediction closer to 0. However, the personal style generator 406's goal is to use the loss of the discriminators as an objective function to modify parameters or weights of its model in order to maximize the loss of the discriminators. Using the example, above, the goal is to get the personal style discriminator 407 to output a 1 instead of a 0. In this way, the loss from both the personal style discriminator 407 and the calibration discriminator 409 is passed to the personal style generator 405 so that the personal style generator 405 can maximize the loss (or get an incorrect prediction) of the discriminators.

In some embodiments, the error loss function of the discriminators are: $E=-\ln(1-D(x))$, where D is the output of prediction of the discriminators. In some embodiments, the error loss function of the personal style generator 405 is $E=-\ln(D(G(z)))$, where G is the output or prediction of the personal style generator 405.

The derivatives of these two error loss functions can help the model update the weights of the personal style generator 405, the personal style discriminator 407, and the calibration discriminator 409 in order to improve a particular prediction. Accordingly, the tension or adversarial nature between these components adjusts weights in the respective models, such that there is no collision. This process can be repeated many times during training. After various iterations or epochs, the personal style generator 405 will be trained to generate images with pixel values that closely resemble the personal style(s) of the user based on the personal style discriminator 407 and where the personal style(s) have a realistic look based on the calibration discriminator 409.

In some embodiments, at runtime or when a model is deployed after training, the personal style generator 405 generates actual source images (e.g., images indicated in a video feed of a meeting application) and because it has been trained with the correct loss, it outputs images with data representing the user's personal style in a manner that looks realistic. This is because it generates optimal pixel values inside an acceptable threshold determined by the personal style discriminator 407 and the calibration discriminator 409 (i.e., the personal style generator 405 fools the personal style discriminator 407 and calibration discriminator 409).

Figure 5A:
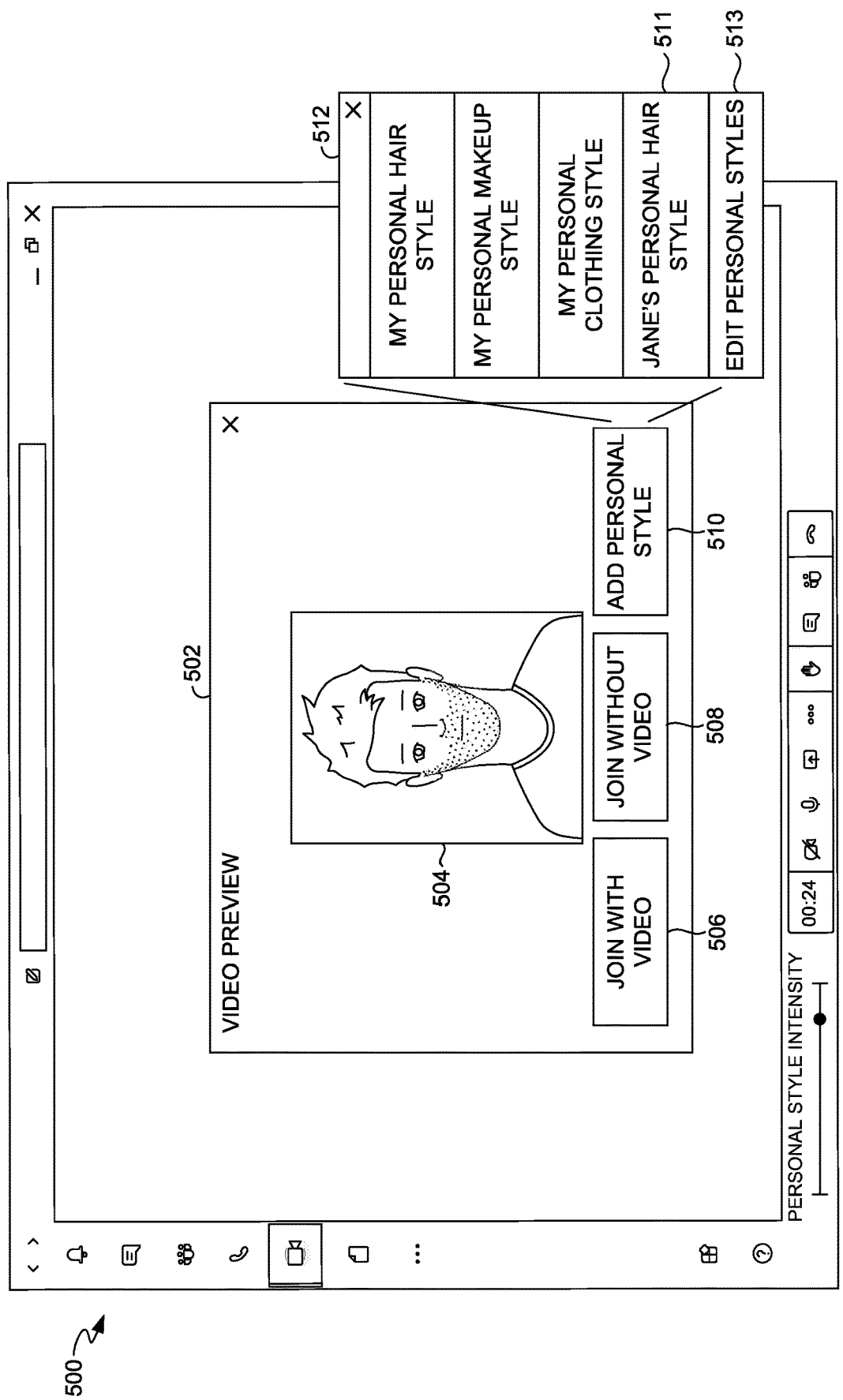
FIG. 5A is a screenshot of an example user interface of a meeting application, according to some embodiments.

FIG. 5A is a screenshot 500 of an example user interface of a meeting application, according to some embodiments. In some embodiments, the screenshot 500 is included in the consumer application 214 and/or is caused to be presented by the presentation component 212 of FIG. 2. FIG. 5A illustrates that a user can selectively choose to add one or more personal styles to a video feed, according to some embodiments.

The screenshot 500 includes a video preview window 502, which includes the buttons 506, 508, and 510. The screenshot further includes the window 512. In response to receiving an indication that a user has logged into a consumer application, is receiving a video call, or requested connection to a virtual meeting, particular embodiments cause the window 502 to be presented. The window 502 includes the source video feed 504 (e.g., the source image(s) 304 of FIG. 1). A "video feed" as described herein may refer to a sequence of images processed electronically into an analog or digital format and displayed on a screen with sufficient rapidity (e.g., in near real-time) so as to create the illusion or indication of motion and continuity. Such source video feed 504 may represent a user, invitee, or meeting participant who feels that they are not presentable enough the join the meeting via user selection of the button 506. For example, as illustrated in the source video feed 504, their hair is not styled, they are wearing a T-shirt, and they have not shaved.

In response to receiving an indication that the user has selected the "add personal style" button 510, particular embodiments cause presentation of the window 512, at which point particular embodiments can receive indications of one or more user selections of particular personal styles as indicated, such as the user's personal hair style, the user's personal makeup style, the user's personal clothing style, and/or Jane's (e.g., another user's or invitee's) personal hair style.

In some embodiments, the user's personal hair style, personal makeup style, and personal clothing style represent an output of functionality that can determine (e.g., learn) and cluster or classify different personal styles of the user and then responsively cause presentation of the indicators that represent such clusters or classification groups. For example, in some embodiments, the dataset of target image(s) 403 may include various images of the user employing different styles at different times. For instance, a first image and a second image can include the user wearing a first shirt and a third image can include the same user wearing a different shirt. Embodiments can then cluster (e.g., via a clustering model) each style according to their individual pixel value features and/or positions. For example, using the illustration above, embodiments can cluster the first image and the second image into "T-shirt Y style" and then cluster the third image into "T-shirt X style." And based on the clustering, particular embodiments can cause presentation, to a user device, of an indicator (e.g., the "my personal clothing style" indicator in the window 512) that is user-selected to allow the first user to apply the first image style or the second image style. In other words, each personal style indicator in the window 512 can be provided to the screenshot 500 based on whether embodiments have clustered data representing one or more personal styles together.

In some embodiments, the clustering functionality that embodiments use is K-means clustering. For example, each data point can represent a particular feature (e.g., hair style) of a specific picture. And each cluster can represent a specific personal style. Prior to cluster, a user can select the quantity of clusters he or she wants to identify in the data. This is the "k," value for example in k-means clustering. For example, the user can group data into a "hair style X" cluster, a "dress shirt Y" cluster, and an "makeup" cluster. In some embodiments, the k-value that is selected is determined by calculating the "elbow point" in a plot, which is a point at which variation between data points goes from a relatively large reduction in variation to minimal reduction in variation, as described herein.

Next, in various embodiments, the k value of distinct data points are randomly selected as the initial clusters. For example, where k=3, the data points themselves can be selected as the initial clusters. Next, a distance can be measured (e.g., by the one or more machine learning models 306) between a first point of a plurality of data points and each point of the initially selected clusters. For example, a first data point is selected (e.g., as the "first point"), then the distance (e.g., Euclidian distance) between this data point and each of the initially selected clusters is measured. Next, the first point is assigned (e.g., by the one or more machine learning models 306) to the nearest of the initially selected clusters, such that two points are now within the same cluster. For example, the first data point is assigned to the cluster or another data point, since the distance between the first data point and a second data point is closer than the distance between first data point and a third data point. Next, this process is repeated for each data point.

In some embodiments, after each point of the plurality of points has been assigned to a cluster, the mean or center data point of each cluster is then calculated (e.g., by the one or more machine learning models 306), which concludes a first round of clustering. Responsively, each center data point or mean is then used as initial data point clusters and the process described above is repeated for a second round of clustering. In some embodiments, after this second round (or other quantity) of assigning data points to clusters and determining another mean value, it is determined (e.g., by the machine learning model(s) 306) whether there have been clustering changes above a threshold. For example, it is determined whether the change in clusters between the first round and second round have changed outside of some threshold (e.g., the mean is plus or minus a particular value in difference between the first round and the second round). If there has been no change outside of a threshold, then the clustering process can conclude. However, if there is a change outside of the threshold, then particular rounds can be added until the clusters do not change outside of the threshold.

In some embodiments, users can share (e.g., exchange or upload) files that include their personal styles or tailored models, or receive the styles or models of other users, so that different personal styles of different users can be applied. For instance, a user might share (or receive) a file that includes information about a personal style or tailored model with a friend, or may receive such a file from a celebrity or social media influencer. In some implementations, a user may purchase (or receive) style information from a brand or human model, such as lipstick from a makeup brand. Similarly, in some implementations, users may sell their styles to others (e.g., on social media, a style market website, or via an app). In particular, in such embodiments, the modified GAN model 400 can be trained to apply the user's style indicated in the video sequence 504. Likewise, a second modified GAN model can be trained to apply a different user's style to the same video sequence 504. For instance, in the example depicted in FIG. 5A, in response to receiving an indication that the user has selected the "Jane's personal hair style," indicator (511), particular embodiments can feed the video feed 504 into the second modified GAN so that the personal style generator generates data representing Jane's personal hair style (e.g., long curly hair) and applies it to landmarks or features representing the user's head in the image 504.

Figure 5B:
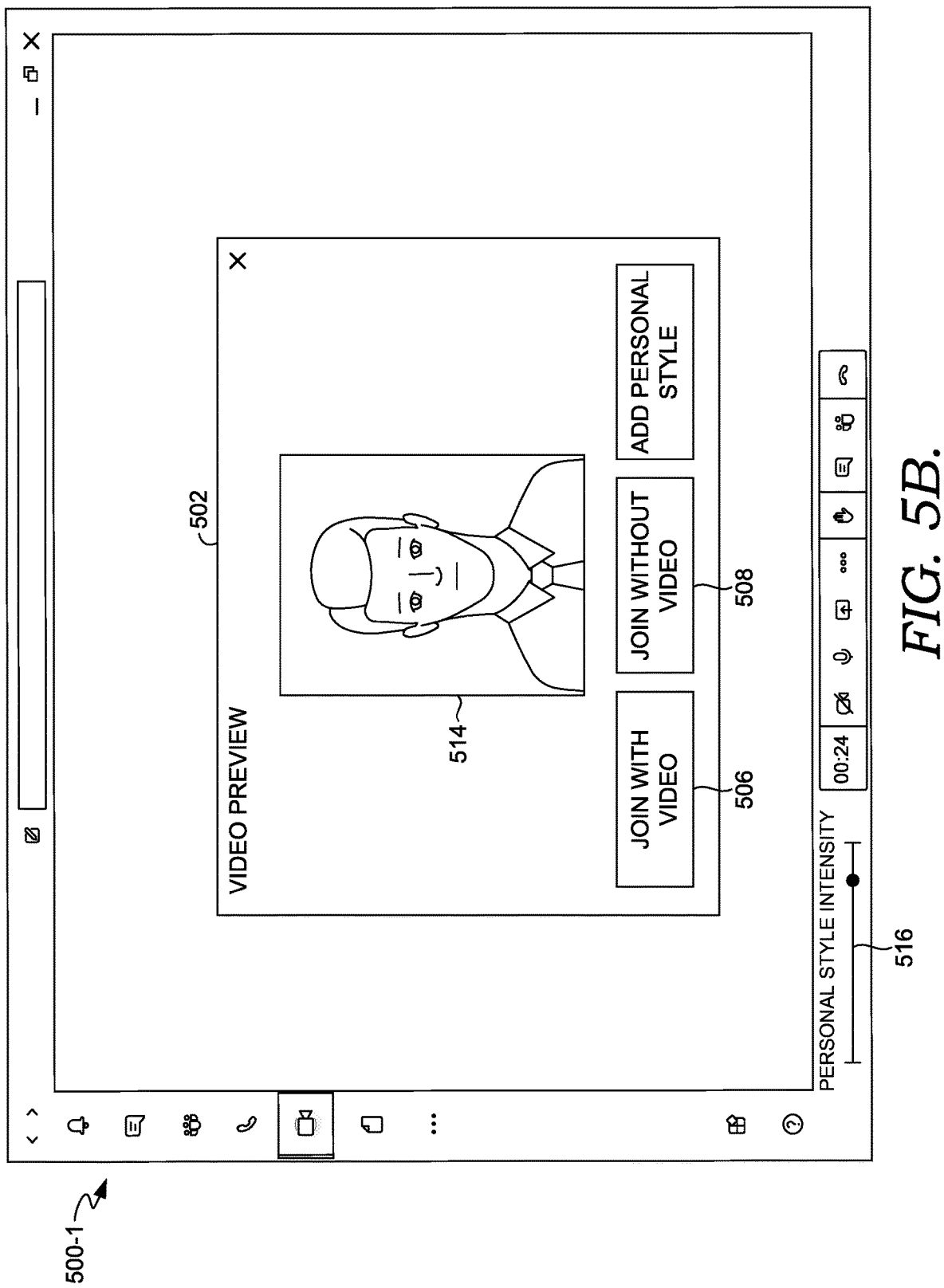
FIG. 5B is a screenshot of an example user interface that represents the screenshot of FIG. 5A at a subsequent time, according to embodiments.

In response to receiving an indication that the user has selected one or more indicators of one or more personal styles within the window 512, various embodiments transfer or apply data representing the specific personal style of the selected indicators (e.g., via the personal style transfer component 210 of FIG. 2 or the modified GAN 400 of FIG. 4), as illustrated in the image 514 (e.g., representing the 304-1 of FIG. 3) of FIG. 5B. In an illustrative example, in response to receiving an indication that the user has selected the "my personal hair style indicator," the personal style transfer component 210 can stream or pass the source video feed 504 of the user to the modified GAN 400, which is then received by the personal style generator 405. The personal style generator 405, having been trained at the appropriate loss, will then apply data representing the personalized styled hair of the user, as illustrated in the image 514 of FIG. 5B. Accordingly, the personal style generator 405 will generate the appropriate pixel values at the appropriate location using the dataset of the target image(s) 403, which the personal style discriminator 407 and the calibration discriminator 409 will then deem to be present and real (i.e., comes from the dataset of target image(s) 403 based on the generated values meeting a threshold) respectively.

FIG. 5B is a screenshot 500-1 of a user interface that represents the screenshot 500 of FIG. 5A at a subsequent time, according to embodiments. In response to receiving an indication that the user has selected one or more of the personal styles indicated in the window 512, particular embodiments apply the persona style to the image 504, as represented in 514 of FIG. 5B. In this way, the user can get a preview of the way the user looks with his or her personal style before the meeting begins.

In response to receiving an indication that the user has selectively modified the personal style intensity scale 516, particular embodiments (e.g., the personal style transfer component 210) change (e.g., adds or removes) the quantity pixels that represent the personal style. For example, in response to receiving an indication that the user has scrolled the personal style intensity scale 516 button to the right, particular embodiments add more pixels or replace existing pixels (which may be carried out using a non-destructive layering technique, such as described herein), which is indicative of adding more hairs to the user's head. Alternatively, or additionally, some embodiments change the pixel value intensity or other properties of existing pixels. For example, in response to receiving an indication that the user has scrolled the intensity scale button to the left, particular embodiments change the pixel values, which is indicative of fading or making the user's hair a lighter color.

Adjusting the personal style intensity via the personal style intensity scale 516 can be accomplished through any suitable functionality. For example, in some embodiments, each personal style represents a procedural effect or pre-recorded or pre-determined process (e.g., an algorithm of procedural textures). In some embodiments, the pre-recorded processes are combined so that the user can incorporate all the personal styles at once, while retaining the ability to modify any one of the pre-recorded processes or personal style. In this way, each personal style can be manipulated to change the overall personal style such that they are fully editable. (For instance, one example embodiment for editing a personal style is described in connection with FIG. 5D.) In this way, the user has full control over the personal style. For example, at a first time a first process can add a hair style layer of a personal style to a source image and the user can subsequently modify (e.g., cut, add features to, delete) the makeup layer on the source image. At a second time subsequent to the first time, a second process can add a foreground layer of the same personal style to the source image and the user can subsequently modify the foreground layer. In some embodiments, a user may select (or specify) a region or zone of a the source image, which may correspond to a bounding boxes as described herein, to apply or exclude a personal style, and in some instances may specify multiple zones of the source image for which different style layers are applied (or excluded), such as described in connection with FIG. 5D. Accordingly, various embodiments do not aggregate all the pixel manipulations of a personal style into a single pass or layer, which is destructive and existing models do. Rather, they procedurally add pixel manipulations such that each manipulation can be fully editable by users.

In some embodiments, adjusting the personal style intensity includes deriving and then producing a particular image generated by the personal style generator 405 in response to receiving an indication that the user has adjusted the personal style intensity scale 516. In some embodiments, in response the receiving of this indication, embodiments can deactivate both the personal style discriminator 407 and the calibration discriminator 409 such that each image produced by the personal style generator 405 can be produced (instead of only the ones that fool the discriminators). In an example illustration, in response to receiving an indication that the user has adjusted the personal style intensity of the personal style intensity scale 516 to a higher level, the personal style generator 405 can generate an image an image with more pixels and/or adjusted pixel values to indicate more or different filtering effects associated with the personal style, which directly indicates the requested personal style intensity. Subsequently, responsive to receiving an indication that the user has adjusted the personal style intensity of the personal style intensity scale 516, the personal style generator 405 can remove the current image and then produce another image having fewer pixels and/or lowered pixel values to indicate a decrease and/or lower filtering effects associated with the personal style.

Figure 5C:
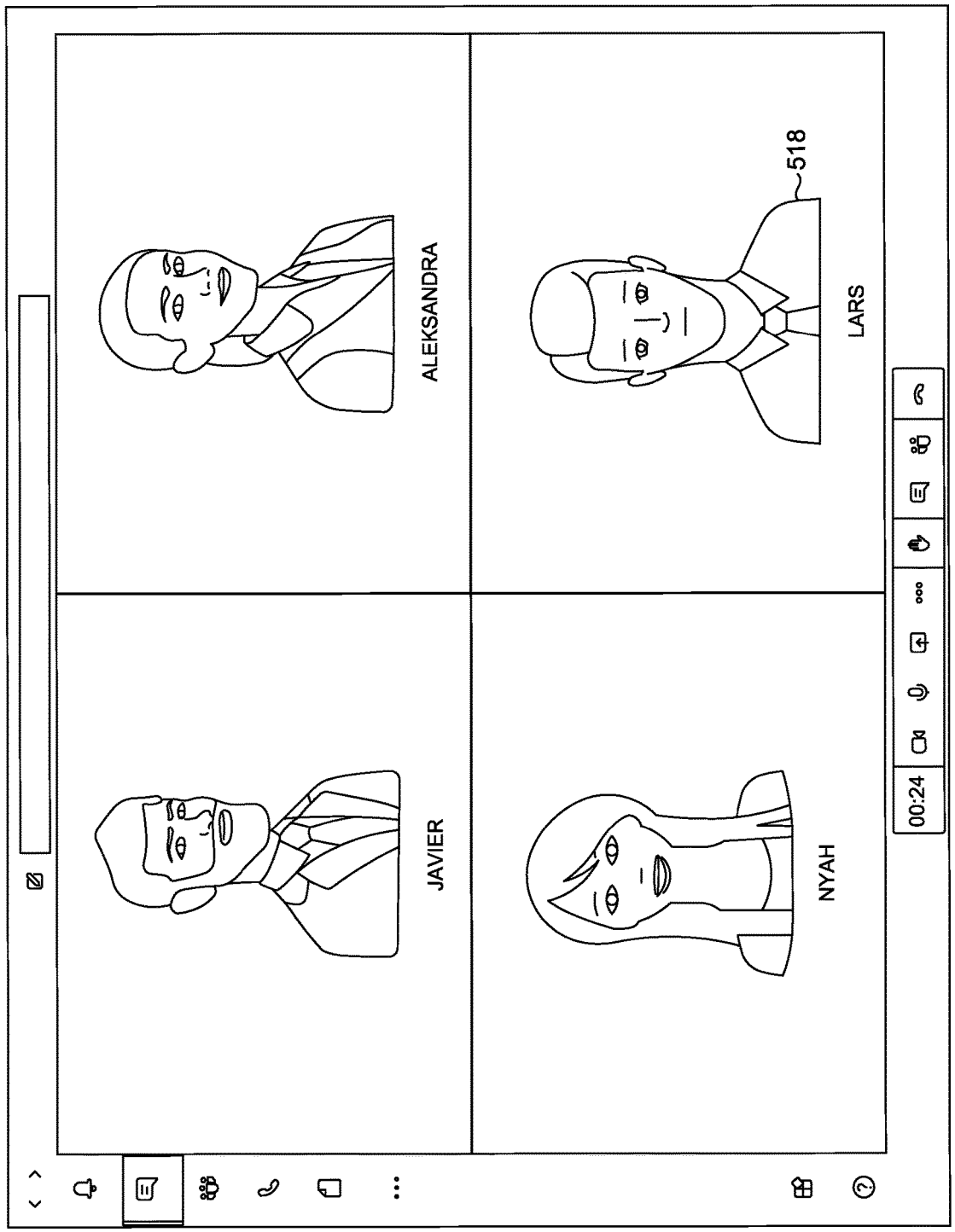
FIG. 5C is a screenshot of an example user interface that is rendered in response to receiving an indication that the user has made a selection at the screenshot of FIG. 5B, according to some embodiments.

FIG. 5C is a screenshot 500-2 of an example user interface that is rendered in response to receiving an indication that the user has made a selection at the screenshot 500-1 of FIG. 5B, according to some embodiments. For example, after the image 514 (of FIG. 5B) has been presented and in response to receiving an indication that the user has selected the "join with video button 506" in FIG. 5B, particular embodiments grant the request for the user to join the meeting and cause presentation of the screenshot 500-2. As illustrated in the screenshot 500-2, the image 518 of the user includes the same personal style as indicated in the image 514 of FIG. 5B. In this way, other meeting attendees or users can only view the user with his personal style, which looks realistic from their perspective (e.g., given the modified GAN), even though the true appearance of the user more closely resembles the image 504 of FIG. 5A.

Figure 5D:
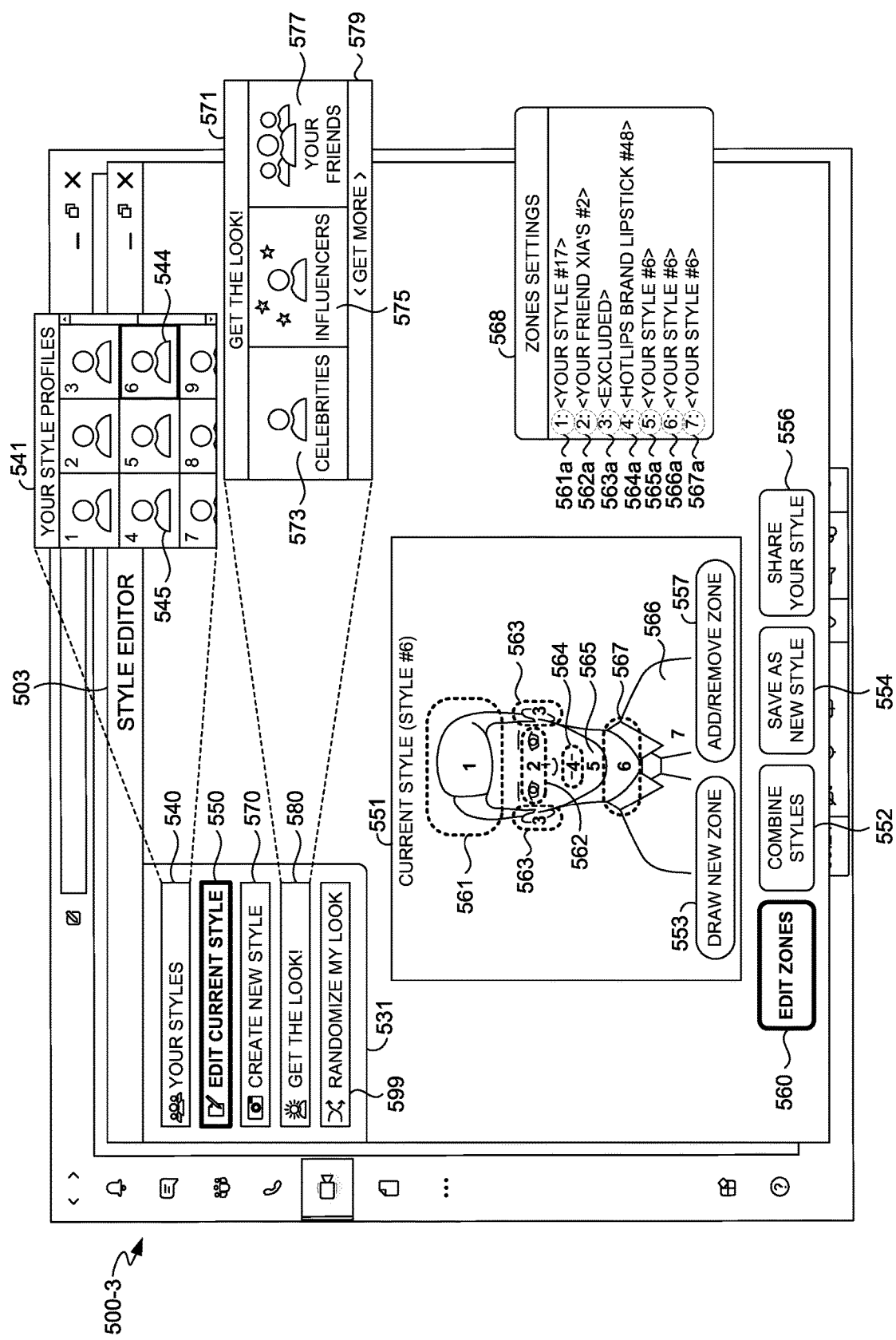
FIG. 5D is a screenshot of an example user interface for editing, creating, or sharing a user's personal styles, according to some embodiments.

FIG. 5D illustrates example aspects of a computer application, service, or routine that enables a user to edit and manage their personal styles, according to some embodiments. In particular, FIG. 5D shows a screenshot 500-3 of a user interface that represents the screenshot 500 of FIG. 5A at a subsequent time, according to some embodiments. For example, in response to receiving an indication that the user has requested to edit a personal style (e.g., such as by selecting "edit personal styles" menu item 513 in the window 512 of FIG. 5A) particular embodiments may provide style editor 503 for editing styles including adding styles, or creating new styles. Embodiments of style editor 503 may be included in the consumer application 214, may be a separate consumer application, and/or may be caused to be presented by the presentation component 212 of FIG. 2.

As shown in FIG. 5D, example style editor 503 includes menu 531 of various items corresponding to computer programming functionalities to facilitate editing and managing a user's personal style(s) including a your styles item 540, edit current style 550, create new style 570, get the look item 580, and randomize my look 599. Responsive to selecting the your styles item 540, style editor 503 may present a window 541 showing the user's style profiles (indicted as "your style profiles"). The user's style profiles window 541 includes one or more of the user's styles (e.g., style 544 and style 545), each of which may correspond to a personal style for the user based on image(s) or style-related information for the user (or for one or more other users, as described herein), and which may be selectable by the user for editing or to be applied to the user's source image(s) (e.g., as described in connection with FIG. 5A). In some embodiments, styles profile window 541 corresponds to a library of the user' styles, which may be stored in storage 225.

In the example screenshot 500-3, style #6 (item 544) is selected for editing, and is presented via an editor window 551. Editor window 551 may be presented in response to selecting edit current style 550 in menu 531. In some embodiments (not shown), clicking on an edit icon (e.g., a pencil) on style profiles window 541 or an individual style 544) may cause editor window 551 to be presented. In this example embodiment, editor window 551 includes tools (560, 552, 554, and 556) for editing or modifying the current style.

An edit zones tool 560 is provided for editing zones of the current style. As described herein, in some embodiments, aspects of one or more existing styles may be applied to a new style or may be configured in the existing style for application to the user's source image(s). For example, a user may apply only a portion of the existing style, such as only the hair, to the source image(s). Similarly, a user may configure a new (or updated) personal style that applies the hair from a first existing style, the makeup from a second existing style, and the clothing from a third existing style. Accordingly, style editor 503 may be used to facilitate a user's selection aspects of one or more existing styles to be used in a new (or updated) personal style.

In some embodiments, the edit zones tool 560 allows users to improve the style transfer algorithm by letting users make adjustments to personal style so that the model can correct or fine-tune how a specific personal style is applied. In addition to letting the user combine granular styles (e.g., nose and eyebrows), particular embodiments allow them to fine-tune how an individual style (e.g. nose) is applied to their face specifically. For instance, a user may adjust the pixel values and/or how much data representing makeup is applied. In response to receiving an indication of these user adjustments, particular embodiments can feed these adjustments back into the model to improve its future accuracy. For example, particular embodiments can learn the pixel values or orientation of user adjustments such that the next time makeup is applied, it is applied in a manner that reflects the user adjustments.

Some embodiments "socialize" or crowd source the adjustments made by individual users via the edit zones tool 560 by feeding their adjustments into a shared model (assuming it's hosted in a central place, e.g. a server). In this way, the algorithm gets better over time as more and more users make adjustments. For example, a model that learns a first personal style (e.g., a hair style) may be shared between various users such that users can apply the same first personal style. Over time, each of those various users may apply the first personal style at a particular pixel value and/or apply more or less data of the first personal style. Accordingly, particular embodiments can aggregate (e.g., via a dot product) the corresponding vector values representing personal style so that the aggregated values can be applied at a future time the first personal style is requested by a particular user. For instance, various users may apply a particular makeup style at a certain intensity that is considerably less than the intensity originally trained by a model. The model may receive feedback made from all of these combined user adjustments and responsively generate the particular makeup style intensity that reflects what the users have changed the intensity to. In this way, users are not as likely to make as many manual adjustments.

In some embodiments, style editor 503 includes functionality enabling a user to specify regions or zones of the user's face, head, upper torso, or other locations, which may correspond to a bounding box as described herein, to apply or exclude a particular existing style. In some instances, multiple zones may be specified, each corresponding to a particular style. Thus, each zone may be configured by the user for applying (or excluding) a particular style. For instance, in the example depicted in editor window 551, the edit zones tool 560 is selected and the current style (style #6) is shown as having seven zones: zone 561 through zone 567, corresponding to zones 1-7 of current style #6.

A zone settings window 568 indicates an existing style that corresponds to a particular zone, and may be configured by the user, in some embodiments. For example, by selecting a zone indicator 561a in zone settings window 568, a user may designate (e.g., via style profiles window 541) a style from the user's style profiles or style library, such as style #17 corresponding to zone 561, shown here. In this example, according to the zone settings window 568, zone indictor 562a (corresponding to zone 562) specifies a style received from the user's friend Xia ("Your friend Xia's style #2"). Zone 562, which is shown defining an area of the eyes, may represent an eye-makeup or eye-related style, and can be applied to the user's source image(s), as described herein in connection with FIGS. 3, 4, and 5A, so that the resulting style is personalized to the user. Thus, the user's updated style 6 may include an eye makeup (or eye-related) style for the user that is influenced by the friend's XIA's style #2.

Zone settings window 568 indicates that zone 563 (as indicated by zone indicator 563a) is excluded. An "excluded" setting indicates that a personalized style will not be applied to the user's source image(s) for this zone. For example, here zone 563 corresponds to an area including the user's ears. Perhaps the user is wearing earrings that he or she wants to be seen in the resulting image that is presented to other viewers on a video conference. Thus, a personalized style transfer will not be applied to the user's source image(s) for the ear area.

Zone settings window 568 indicates that zone 564 (as indicated by zone indicator 564a) specifies a style "Hotlips Brand Lipstick #48". Similar to how some embodiments described herein enable users to share or receive styles from friends, in some embodiments, styles may be received (and in some instances purchased) from products or brands. For example, a makeup company, such as Hotlips may produce and make available styles for users to use to influence their personal style, as described herein. In some embodiments, the styles may comprise style information, logic, settings, or one or more file(s) that specify model- or image-related information for use by the processes described herein for transferring a style to the user, and thus producing a personalized style. In this example, according to zone settings window 568, the user will appear to be wearing lipstick color #48 from the Hotlips brand. In some instances, companies may sell such styles on their websites, make them available via social media, or include them as promotional items (or make them available such as via a code or link) with the purchase of real-world products. These acquired styles may be imported into a user's style profiles or library.

Zone settings window 568 indicates that zone 565, 566, and 567 (as indicated by zone indicators 565a, 566a, and 567a) specify user's style #6. Also depicted in editor window 551, are zone-editing tools 553 and 557. Selecting zone editing tool 553 initiates program functionality enabling the user to draw or delineate a new zone in the current style depicted in editor window 551. For example, a user may draw a boundary around a portion of the image depicted in editor 551 for specifying a new zone (e.g., zone 564 corresponding to the area of the lips in the image). Selecting zone editing tool 557 initiates program functionality for adding a new zone, which may be pre-defined (e.g., a zone for the hair, eyes, ears and neck, lips, face, or shirt) or selecting and removing an existing zone.

Editor window 551 includes a combine styles tool 552, that initiates functionality for combining aspects of two or more styles. In contrast to combining styles using zones, described above, combine styles tool 552 may combine two or more entire styles into a resulting hybrid style, such as by using information from each component style in the processes described in FIGS. 3, 4, and 5A. Save as new style tool 554 enables a user to save their edited or updated style as a new style their style profiles or library. Share your style tool 556 enables a user to share their style, such as via posting to social media, or attaching the style (or style-related information) to a communication such as an email, SMS, or text message, or otherwise communicating the style (e.g., uploading/downloading it, or transferring it over Wi-Fi, Bluetooth, or the like).

Continuing with style editor 503, in response to selecting create new style 570 in menu 531, an image capturing process may be initiated to capture images of the user for use in creating a new personal style, such as described in connection with content extraction component 204 and personal style extraction component 206 in FIG. 2. In some embodiments, responsive to selecting create new style 570 a step-by-step process is presented to the user to facilitate capturing one or more images of the user for determining a personal style. For example, a sequence of images or video clip may be recorded of the of the user's head in different positions or a reading text. In this way, the user can create a new style on a particular day or session where the user's appearance is such that the user desires to use that appearance as a personal style for future sessions.

Responsive to selecting get the look item 580 in menu 531, style editor 503 may present window 571 showing source(s) of styles that a user may desire to acquire for influencing their personal style, as described herein. Example window 571 shows three sources of style information: celebrities 573, social media influencers 575, and your friends 577, and a link 579 to get more sources. Selecting one of these sources may navigate the user to a collection of styles corresponding to that source, such as a website, online library, repository, social media venue, or the like, where the user can browse, select, and import these styles into their style profiles or library. In some instances, users may be required to purchase these styles before receiving them. In this way, a user may "get the look" of another user by receiving the other user's style and using it to influence their own style, according to the processes described in connection with FIGS. 3, 4, and 5A, so that the resulting style is personalized to the user.

If the user really likes the styles of a particular person (e.g., a celebrity) and makes corresponding selections (e.g., within the window 571), particular embodiments help train/optimize the style transfer algorithm to work better on transfers from that person to them. For example, if a user wants to look like a first actor in in all the user's meetings, particular embodiments optimize the style transfer algorithm's ability to transfer the actor's styles onto the user's face. In some embodiments, this occurs via the edit zones tool 560 to let the user adjust, feed those adjustments back into the model, repeat this for a few different style transfers from the same source (e.g., celebrity), and via this iteration teach the style transfer algorithm to be better at applying styles from that source to a specific target (e.g. me).

Responsive to selecting randomize my look 599, some embodiments of style editor 503 may automatically randomly (or pseudo randomly) select an existing user's personal style (e.g., from their style profile or library) and apply the style to the user's source image(s). In other embodiments, randomize my look 599 may combine the properties of two or more styles of a user (or styles from the user's style profiles, which may include styles from other users) to create a new style, which in some implementations may be subjected to a discriminator or the modified GAN model in order to generate a realistic style transfer to the user's source image(s).

Figure 6:
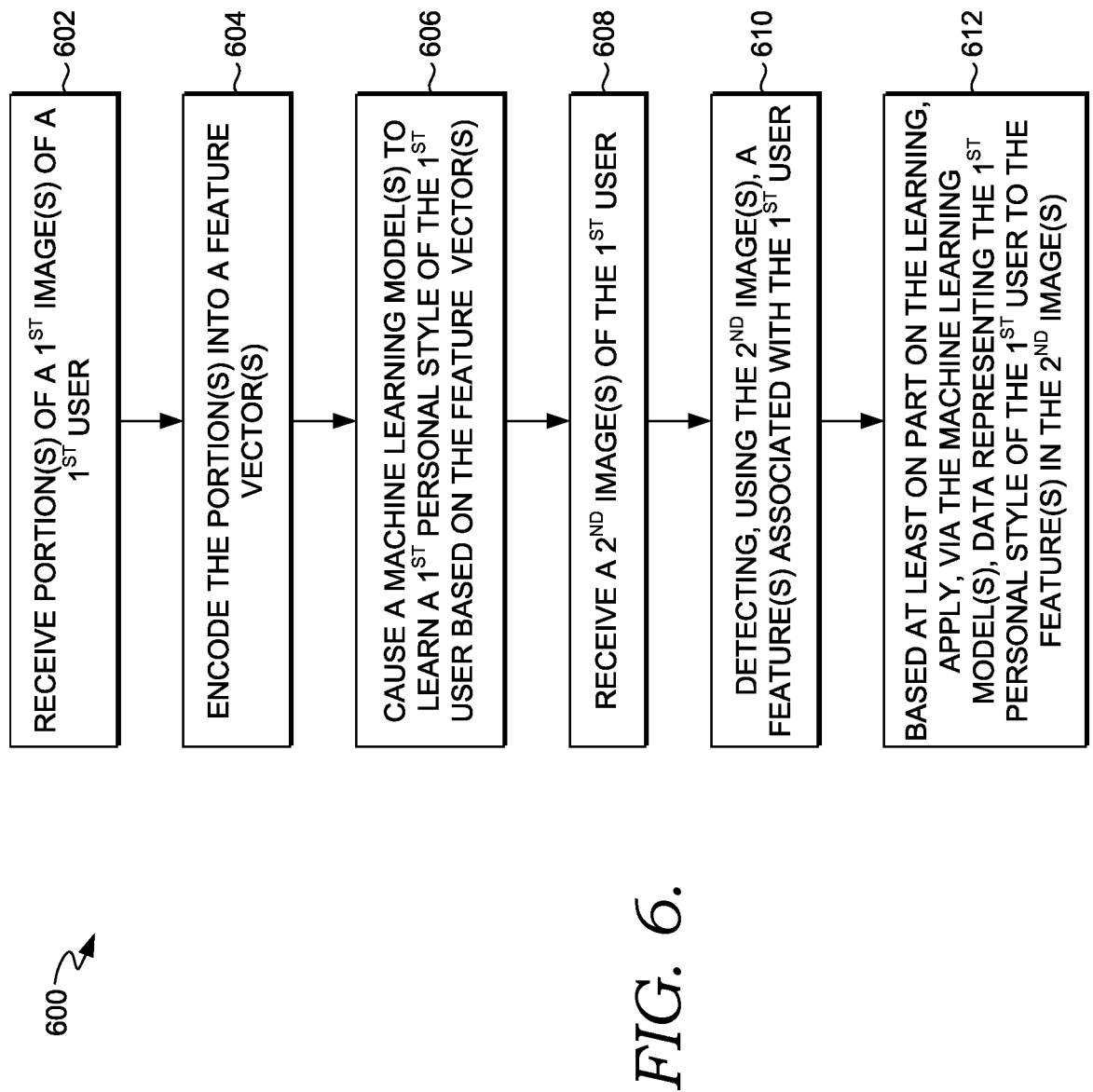
FIG. 6 is a flow diagram of an example process for applying, via one or more machine learning models, data representing a first personal style of a first user to an image, according to some embodiments.

Turning now to FIG. 6, a flow diagram of an example process 600 for applying, via one or more machine learning models, data representing a first personal style of a first user to an image, according to some embodiments. The process 600 (and/or any of the functionality described herein, such as process 700) may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. For example, blocks 604 and 606 need not occur, but rather personal style, for instance, can be determined without using a machine learning model. Further, more (or fewer) blocks may exist than illustrated. The computer-implemented method, the system (that includes at least one computing device having at least one processor and at least one computer readable storage medium), and/or the computer storage media as described herein may perform or be caused to perform the processes 600 or any other functionality described herein.

Per block 602, particular embodiments receive at least one or more portions of one or more first images (e.g., the one or more target images 302 of FIG. 3) of a first user. Examples of this block are described with respect to the content extraction component 204 of FIG. 2. As described herein "one or more portions" can represent an entire image or only a portion of an image. In some embodiments, the one or more first images includes a snapshot digital photogram of the first user. For instance, the one or more first images may only be a single target image, as indicated in 302 of FIG. 3. In some embodiments, the one or more first images includes a video feed of the first user. For example, the one or more images may represent a sequence of video frames that records, via a web cam, the first user for a predetermined quantity of time. In some embodiments, the one or more portions received represents only a first portion of an entire image, where particular embodiments anonymize (e.g., encrypt, obfuscate, or mask) other portions of the image such that only the first portion is received based on one or more predefined rules. For example, conditional logic may state to anonymize all features in an image except for hair, shirt, and mouth areas, so as to preserve the identity privacy of the first user.

Per block 604, particular embodiments encode the one or more portions into one or more feature vectors. A "feature vector" as described herein includes one or more numbers (e.g., a series of floating values or integers (e.g., [0, 1, 0, 0,])), that represent or correspond to one or more features in an image. A machine learning model can encode or convert, for example, pixel values representing a personal style (or an entire image) and their orientation into corresponding feature vectors locations, which are then embedded in feature space based on their similarity in terms of their pixel values and/or orientation. Encoding occurs because computers do not understand or process image data, unless that image data is first encoded to number, which computers process. Feature vectors (e.g., of different image styles of the same image) can be combined with weights (e.g., using a dot product) in order to construct a prediction function that is used to determine a score for making a prediction, as described, for example, with respect to the modified GAN 400 of FIG. 4.

Per block 606, particular embodiments cause one or more machine learning models to learn a first personal style of the first user based on the one or more feature vectors. Examples of this are described with respect to the personal style extraction component 206 and the modified GAN 400 of FIG. 4. For example, within the dataset of target images 403 of FIG. 4, there may be one or more third images of the first user, where the one or more third images are indicative of the first user without data indicative of the first personal style (e.g., the user without makeup). The dataset of target image(s) 403 may further include images (the one or more first images) indicative of the first user with the first personal style (e.g., with makeup). Particular embodiments, such as a machine learning model, can determine, by comparing the one or more first images of the first user to the one or more third images, a difference between the one or more first images and the one or more third images. Based on the determining of the difference, particular embodiments determine or learn the first personal style.

The determining of the difference can be based on distance functionality associated with feature vectors representing the first and second images. For example, the one or more first images can be encoded into a first feature vector and the one or more third images can be converted into a second feature vector. Responsively, a distance can be determined between the two sets to determine the delta or remainder that indicates the personal style of the user. The distance between any two feature vectors is measured according to any suitable method. For example, in some embodiments, automated cosine similarity is used to compute distance. Cosine similarity is a measure of similarity between two non-zero vectors of an inner product space that measures the cosine of the angle between the two non-zero vectors. In these embodiments, no similarity is expressed as a 90-degree angle, while total similarity (i.e., the same pixel values) of 1 is a 0 degree angle. For example, a 0.98 distance between two words reflects a very high similarity while a 0.003 distance reflects little similarity. In other embodiments, Euclidian distance is used.

In some embodiments, the learning of the first personal style of the first user and the applying of the set of data is based at least in part on using a personal style generator that generates synthetic images and using at least a personal style discriminator that causes the one or more second images to be produced based on whether or not the one or more second images contains the first personal style. For example, the personal style discriminator 407 can learn, via training, the optimal loss or pixel values/positions to determine whether an image comes from the personal style dataset (i.e., it is present or not), as described with respect to FIG. 4. Alternatively, or additionally, in some embodiments, the learning of the personal style includes the calibration discriminator 409 learning, via training, the optimal or pixel values/positions to determine whether an image is real or fake, as described with respect to FIG. 4. Alternatively, or additionally, in some embodiments, the learning of the personal style includes the personal style generator 405 learning, via training, the optimal or pixel values/positions to generate a personal style at in order to fool the discriminators, as described with respect to FIG. 4.

In some embodiments, the first personal style can be any suitable personal style or combination of personal styles, such as one or more of: a hair style of the first user, a makeup style of the first user, a facial hair style of the first user, and a clothing style of the first user. Examples of this are described with respect to FIGS. 5A, 5B, and 5C.

In some embodiments, block 606 is alternatively or additionally indicative of determining, using at least the portion, data indicative of the personal style of the first user. Examples of this are described with respect to the personal style extraction component 206. For example, embodiments can compare a delta in pixel values between images where the user is employing his or her personal style versus not employing the personal style (e.g., the portion), where the delta is the personal style.

In some embodiments, different personal styles can be clustered into different image styles, and based on the clustering, particular embodiments cause presentation, to a user device, of an indicator that is user-selectable to allow the first user to apply the first image style of a second image style to the one or more second images. Examples of this are described with respect to the "my personal" personal styles indicated in the window 512 of FIG. 5A. Likewise, some embodiments determine, using at least the portion received at block 602, second data indicative of a second personal style of the first user. In response to the receiving of the one or more second images, particular embodiments detect, using the one or more second images, one or more second features of the first user. Particular embodiments generate a user interface element. Based on the determining of the second data and in response to receiving an indication that the user interface element has been selected, embodiments apply the second data indicative of the second personal style of the first user to the one or more second features of the first user in the one or more second images, wherein the one or more second images include the first personal style. Examples of this are described with respect to FIGS. 5A and 5B, where the user can apply, one at a time, the user's personal hair style, or the user's personal makeup style to the same image 504 via selection of the corresponding indicators in the window 512.

Per block 608, some embodiments receive one or more second images (e.g., the one or more source image(s) 304 of FIG. 3) of the first user. Some embodiments alternatively or additionally receive one or more source images of the second user. In some embodiments, the one or more second images represents or includes a video feed of the user, as described, for example, with respect to FIG. 5A, FIG. 5B, and FIG. 5C. In other embodiments, the one or more second images represents a single digital photograph.

Per block 610, some embodiments detect (e.g., in response to the receiving at block 608), using the one or more second images, one or more features associated with the first user. Examples of this are described with respect to the personal style transfer component 210 of FIG. 2. For example, some embodiments can detect certain features or objects (e.g., the first user's head, lips, shoulders, and the like) in the one or more second images and/or use object detection functionality. Alternatively, or additionally, some embodiments generate a mesh grid that represents the one or more second images (though it may not necessarily be the one or more second images), and which contain generate outlines or silhouette of the user, such as head, arms, and neck. In some embodiments, the one or more features detected at block 610 may alternatively or additionally refer to a second user.

Per block 612, based at least in part on the learning, particular embodiments apply, via the one or more machine learning models, data representing (e.g., resembling or indicating) the first personal style of the first user to the one or more features detected in the one or more second images at block 610. Examples of this are described with respect to the personal style transfer component 210 of FIG. 2 and the modified GAN 400 of FIG. 4. The term "apply" as described herein can refer to superimposing or generating data at the one or more second images. In some embodiments, the data that is applied to the one or more features is directly extracted from the one or more first images (e.g., a target image) and applied to the second image. Alternatively, or additionally, the data that is applied to the one or more features contains more or less pixels (or a merged/blended representation) than those pixels representing the personal style in the one or more first images. This can be done in the case where, for example, the modified GAN 400 (or more specifically the personal style generator 405) generates a synthetic image based on learning the optimal loss, which typically causes the resulting output source image to include pixels representing personal styles that are different in value and/or orientation relative to target images because of the loss function learning.

Some embodiments apply data representing personal styles of other users to the one or more second images. For example, embodiments can receive one or more third images of a second user. In response to the receiving, particular embodiments detect (e.g., via the personal style transfer component 210), using the one or more third images, one or more second features of the second user. Based on the determination (or learning) of the data indicative of the first personal style of the first user, particular embodiments apply another set of data indicative of the first personal style of the first user to the one or more features of the second user in the one or more third images. This is described with respect to the "Jane's personal hair style" indicator in the window 502 of FIG. 5A.

Figure 7:
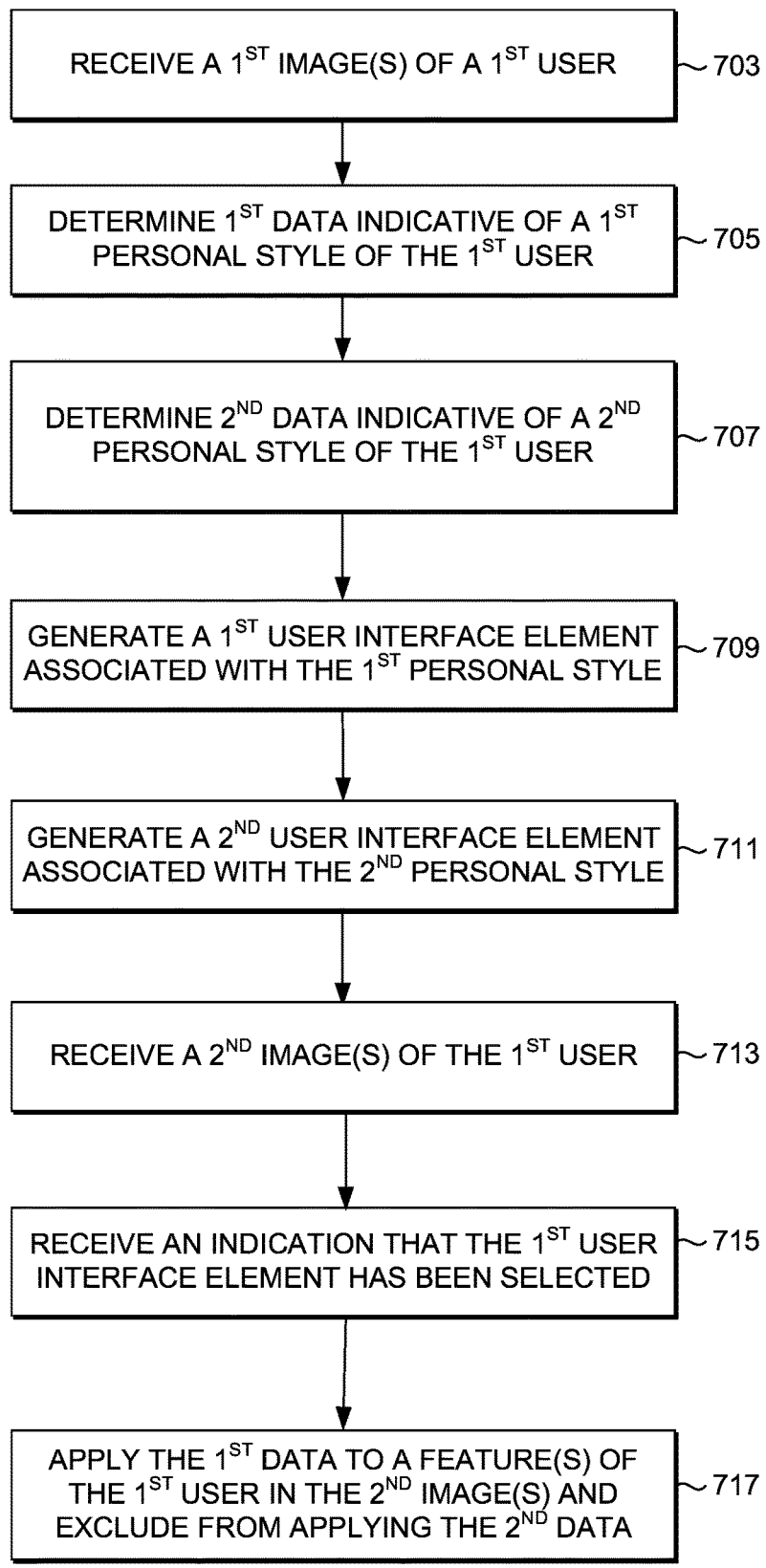
FIG. 7 is a flow diagram of an example process for applying data representing one, of a plurality of personal styles, to a user via user interface functionality, according to some embodiments.

FIG. 7 is a flow diagram of an example process for applying data representing one of a plurality of personal styles, to a user via user interface functionality, according to some embodiments. Per block 703, particular embodiments receive at least a portion of one or more first images of a first user. In some embodiments, block 703 is identical to block 602 of FIG. 2.

Per block 705, particular embodiments determine (e.g., using at least the portion), first data indicative of a first personal style of the first user. In Some embodiments, block 705 includes functionality identical to the functionality described with respect to block 606 of FIG. 6. In an illustrative example of block 705, the machine learning model 306 of FIG. 3 and/or the modified GAN 400 of FIG. 4 can learn or predict the user's "personal hair style" as indicated, for example, in the window 512 of FIG. 5.

Per block 707, particular embodiments determine (e.g., using at least the portion), second data indicative of a second personal style of the first user. In Some embodiments, block 707 includes functionality identical to the functionality described with respect to block 606 of FIG. 6. In an illustrative example of block 707, the machine learning model 306 of FIG. 3 and/or the modified GAN 400 of FIG. 4 can learn or predict the user's "personal makeup style" as indicated, for example, in the window 512 of FIG. 5.

Per block 709, some embodiments generate a first user interface element associated with the first personal style. For example, referring back to FIG. 5A, particular embodiments generate the "my personal hair style" indicator as illustrated in the window 512 and then responsively cause presentation of such indicator at the screenshot 500. Per block 711, some embodiments generate a second user interface element associated with the second personal style. For example, referring back to FIG. 5A, particular embodiments generate the "my personal makeup style" indicator as illustrated in the window 512 and then responsively cause presentation of such indicator at the screenshot 500.

Per block 713, some embodiments receive one or more second images of the first user. In some embodiments, block 713 is identical to the functionality described with respect to block 608 of FIG. 6. Alternatively, or additionally, the one or more second images may be of a second user. Per block 715, particular embodiments receive an indication that the first user interface element has been selected. For example, particular embodiments can receive a flag or control value (e.g., "hair style selected: yes") indicating that the user has selected the "my personal hair style" indicator at the window 512, which is indicative of a request to apply the user's personal hair style to the source image 504.

Per block 717, some embodiments apply (e.g., in response to the receiving of the indication and based on the determining of the first data) the first data indicative of the first personal style of the first user to one or more features of the first user in the one or more second images and exclude (e.g., refrain) from applying the second data to the one or more second images. For example, referring back to FIG. 5A, particular embodiments apply data indicative of the personal hair style of the first user to the first user's head, as illustrated in FIG. 5B. However, for example, if the user only selected the "my personal hair style" indicator indicated in the window 512, other personal styles would be excluded from being applied. That is, they would not be applied to the one or more second images such that they would not be visible. In this way, data representing different personal styles of a user can selectively be applied. For example, referring back to FIG. 5B, if the user only selected to apply data indicative of the user's personal hair style, only that data would be applied (and not the user's personal makeup style, clothing style, etc.), unlike what is represented in FIG. 5B, which illustrates all of the personal styles being applied. In some embodiments, block 715 includes the functionality as described with respect 612 of FIG. 6.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

Figure 9:
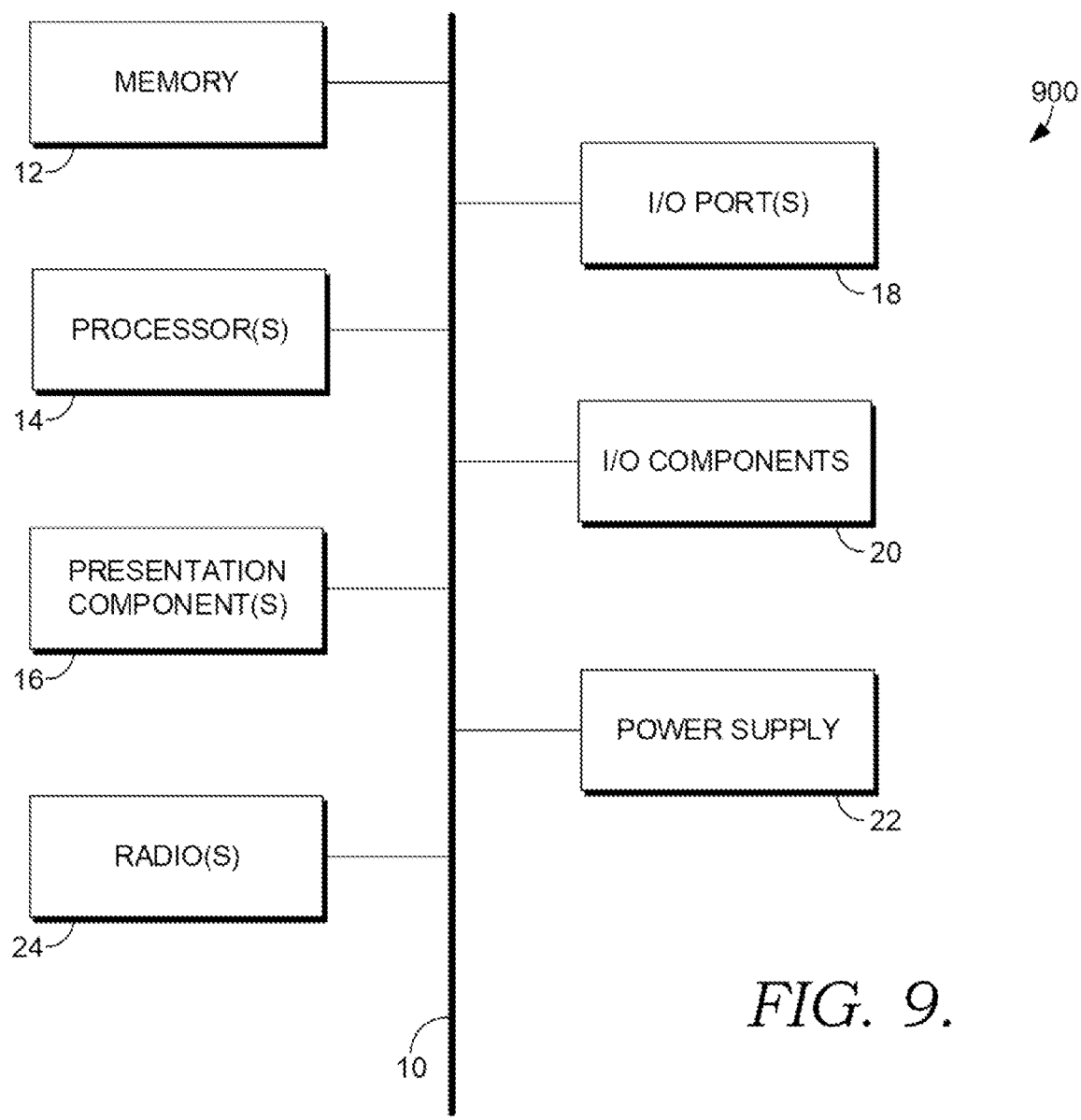
FIG. 9 is a block diagram of an exemplary computing device for use in implementing embodiments of the present disclosure.

With reference to FIG. 9, computing device 900 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more embodiments of the present disclosure. Distinction is not made between such categories as "workstation," "server," "laptop," "handheld device," etc., as each are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 14 that read data from various entities such as memory 12 or I/O components 20. Presentation component(s) 16 presents data indications to a user or other device. In some implementations presentation component 220 of system 212 may be embodied as a presentation component 16. Other examples of presentation components may include a display device, speaker, printing component, vibrating component, and the like.

The I/O ports 18 allow computing device 900 to be logically coupled to other devices, including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some embodiments of computing device 900 may include one or more radio(s) 24 (or similar wireless communication components). The radio 24 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A system comprising:
    one or more processors; and
    computer storage memory having computer-executable instructions stored thereon which, when executed by the one or more processors, implement a method comprising:
        obtaining a first set of images of a first user, a first image of the first set of images including a first representation of a first personal style of the first user and a second image of the first set of images including a second representation of a second personal style of the first user;
        causing a clustering model to classify a first subset of images of the first set of images based on the first personal style;
        encoding a feature vector representing the first personal style based on the first subset of images;
        causing a machine learning model to be trained to generate synthetic images including representations of the first user with the first personal style based on the feature vector, the machine learning model trained by:
            causing the machine learning model to generate a set of synthetic images including representations of the first user with the first personal style based on a second subset of images of the first set of images depicting the first user without the first personal style;
            causing a first discriminator to generate a first set of predictions indicating whether the synthetic images of the set of synthetic images depict the first personal style;
            causing a second discriminator to generate a second set of predictions indicating whether the synthetic images of the set of synthetic images are generated by the machine learning model; and
            modifying a set of parameters of the machine learning model based on the first set of predictions and the second set of predictions;
        receiving a second set of images of the first user;
        detecting, using a third image of the second set of images, a feature associated with the first user;
        causing a user interface element representing the first personal style to be displayed in a user interface; and
        in response to a user interaction with the user interface element, causing the machine learning model to generate the synthetic images representing the first personal style of the first user by at least modifying a subset of images of the second set of images based on the first personal style.

2. The system of claim 1, wherein the first personal style of the first user corresponds to data indicating a style of a group of styles consisting of: a hair style of the first user, a makeup style of the first user, a facial hair style of the first user, and a clothing style of the first user.

3. The system of claim 1, wherein the first set of images includes a snapshot digital photograph of the first user.

4. The system of claim 1, wherein the first set of images includes a video feed of the first user.

5. The system of claim 1, wherein the second set of images includes a video feed of the first user.

6. The system of claim 1, the method further comprising:
    receiving a third set of images of the first user, the third set of images are indicative of the first user without the first personal style;
    determining, by comparing the first subset of images of the first set of images of the first user to a second subset of images of the third set of images, a difference between the first subset of images of the first set of images and the second subset of images of the third set of images; and
    based on the determining of the difference, determining the first personal style.

7. The system of claim 1, the method further comprising:
    obtaining a plurality of images of the first user, at least a third image of the plurality of images, has a same personal style of the first user relative to a second image of the plurality of images, at least a fourth image of the plurality of images, has a different personal style of the first user relative to the third image of the plurality of images and the second image of the plurality of images;
    clustering the third image of the plurality of images and the second image of the plurality of images into the first personal style;
    clustering the fourth image of the plurality of images into the second personal style; and
    based on the clustering, cause presentation, to a user device, of an indicator that is user-selectable to allow the first user to apply the first personal style or the second personal style to the second set of images.

8. The system of claim 1, the method further comprising anonymizing, based on one or more predefined rules, one or more portions of the first set of images such that only a portion of the first set of images are received.

9. The system of claim 1, the method further comprising:
    causing presentation of a first user interface element;
    in response to receiving an indication the first user interface element has been selected, adjusting an intensity of data indicative of rendering a particular quantity of the first personal style of the first user; and
    in response to the adjusting, feeding intensity adjustments into the machine learning model to fine-tune the machine learning model.

10. The system of claim 1, the method further comprising:
    receiving a third set of images of a second user;
    in response to the receiving, detecting, based on at least one image of the third set of images, a second feature vector representing the second user; and based on the first personal style of the first user, causing the machine learning model to apply the first personal style of the first user to the second feature vector.

11. The system of claim 1, the method further comprising:
determining second data indicative of the second personal style of the first user;
in response to the receiving of the second set of images, detecting, using the second set of images, one or more second features of the first user;
generating a first user interface element; and
based on the determining of the second data and in response to receiving an indication that the first user interface element has been selected, applying the second data indicative of the second personal style of the first user to the one or more second features of the first user in the second set of images, wherein the second set of images includes the first personal style.

12. A computer-implemented method comprising:
obtaining a first set of images of a first user, a first image of the first set of images including a first representation of a first personal style of the first user and a second image of the first set of images including a second representation of a second personal style of the first user;
causing a clustering model to classify the first image of the first set of images based on the first personal style and the second image of the first set of images based on the second personal style;
determining first data indicative of the first personal style of the first user, wherein the first data includes a first feature vector representing the first personal style based on the first image;
determining second data indicative of the second personal style of the first user, wherein the second data includes a second feature vector representing the second personal style based on the second image;
causing a machine learning model to be trained by:
 causing the machine learning model to generate a set of synthetic images including representations of the first user with the first personal style based on a first subset of images of the first set of images depicting the first user without the first personal style;
 causing a first discriminator to generate a first set of predictions indicating whether synthetic images of the set of synthetic images depict the first personal style;
 causing a second discriminator to generate a second set of predictions indicating whether the synthetic images of the set of synthetic images are generated by the machine learning model; and
 modifying a set of parameters of the machine learning model based on the first set of predictions and the second set of predictions;
generating a first user interface element associated with the first personal style of the first user;
generating a second user interface element associated with the second personal style of the first user;
receiving a second set of images of the first user;
receiving an indication that the first user interface element has been selected; and
in response to the receiving of the indication, causing the machine learning model to apply the first data indicative of the first personal style of the first user to a third feature vector of the first user generated based on the second set of images.

13. The computer-implemented method of claim 12, wherein the first set of images includes a snapshot digital photograph of the first user.

14. The computer-implemented method of claim 12, wherein the second set of images includes a video feed of the first user.

15. The computer-implemented method of claim 12, further comprising:
receiving a third set of images of the first user, the third set of images depicting the first user without the first personal style;
determining, by comparing the first subset of images of the first set of images of the first user to a second subset of images of the third set of images, a difference between the first subset of images of the first set of images and the second subset of images of the third set of images; and
based on the determining of the difference, determining the first personal style.

16. The computer-implemented method of claim 12, further comprising anonymizing, based on one or more predefined rules, one or more portions of the first set of images such that only a portion of the set of first images are received.

17. The computer-implemented method of claim 12, further comprising:
generating a third user interface element;
in response to receiving a second indication the third user interface element has been selected, adjusting an intensity of data indicative of rendering a particular quantity of the first personal style of the first user.

18. One or more computer storage media having computer-executable instructions embodied thereon that, when executed, by one or more processors, cause the one or more processors to perform a method, the method comprising:
obtaining a first set of images of a first user, a first image of the first set of images including a first representation of a first personal style of the first user and a second image of the first set of images including a second representation of a second personal style of the first user;
causing a clustering model to classify the first image of the first set of images based on the first personal style;
determining data indicative of the first personal style of the first user, wherein the data indicative of the first personal style of the first user includes a feature vector generated based on the first image;
receiving a second set of images of at least one of: the first user and a second user;
in response to the receiving, generating, using a second image of the second set of images, a second feature vector of at least one of: the first user and the second user; and
based on the determining, applying a set of data that resembles the first personal style of the first user to the second feature vector, wherein the set of data is generated by a machine learning model trained by:
 causing the machine learning model to generate a set of synthetic images including representations of the first user with the first personal style based on a subset of images of the first set of images depicting the first user without the first personal style;
 causing a first discriminator to generate a first set of predictions indicating whether synthetic images of the set of synthetic images depict the first personal style;

causing a second discriminator to generate a second set of predictions indicating whether the synthetic images of the set of synthetic images are generated by the machine learning model; and modifying a set of parameters of the machine learning model based on the first set of predictions and the second set of predictions.

19. The one or more computer storage media of claim 18, wherein the data indicative of the first personal style of the first user corresponds to data indicating a style of a group of styles consisting of: a hair style of the first user, a makeup style of the first user, a facial hair style of the first user, and a clothing style of the first user.

20. The one or more computer storage media of claim 18, where the first set of images includes a video feed of the first user.

* * * * *